United States Patent
Fuchida et al.

(10) Patent No.: US 8,405,794 B2
(45) Date of Patent: Mar. 26, 2013

(54) LIGHT DIFFUSING ELEMENT, POLARIZING PLATE WITH LIGHT DIFFUSING ELEMENT, LIQUID CRYSTAL DISPLAY APPARATUS USING BOTH, AND MANUFACTURING METHOD FOR LIGHT DIFFUSING ELEMENT

(75) Inventors: Takehito Fuchida, Ibaraki (JP); Hiroyuki Takemoto, Ibaraki (JP); Shunsuke Shutou, Ibaraki (JP); Minoru Miyatake, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 13/255,062

(22) PCT Filed: Mar. 15, 2010

(86) PCT No.: PCT/JP2010/054309
§ 371 (c)(1), (2), (4) Date: Sep. 6, 2011

(87) PCT Pub. No.: WO2010/106990
PCT Pub. Date: Sep. 23, 2010

(65) Prior Publication Data
US 2011/0317099 A1    Dec. 29, 2011

(30) Foreign Application Priority Data
Mar. 18, 2009   (JP) .................. 2009-065600
Mar. 26, 2009   (JP) .................. 2009-076949

(51) Int. Cl.
*G02F 1/1335*   (2006.01)
*B05D 5/06*     (2006.01)
*G02B 5/02*     (2006.01)

(52) U.S. Cl. .................... 349/64; 359/599; 427/162

(58) Field of Classification Search ............. 349/61–69; 359/599; 427/162
See application file for complete search history.

(56) References Cited

U.S. PATENT DOCUMENTS
(Continued)

FOREIGN PATENT DOCUMENTS
CN    1503009 A1    6/2004
CN    101118291 A   2/2008
(Continued)

OTHER PUBLICATIONS

Japanese International Search Report of PCT/JP2010/054309, mailing date of Jun. 15, 2010.
(Continued)

*Primary Examiner* — Dung T. Nguyen
(74) *Attorney, Agent, or Firm* — Westerman, Hattori, Daniels & Adrian, LLP

(57) ABSTRACT

A light diffusing element of the present invention includes: a matrix containing a resin component and an ultrafine particle component; and light diffusing fine particles dispersed in the matrix, wherein refractive indices of the resin component, the ultrafine particle component, and the light diffusing fine particles satisfy the below-indicated expression (1); and the light diffusing element comprises a concentration adjusted area, which is formed in an outer portion of a vicinity of a surface of each of the light diffusing fine particles, and in which a weight concentration of the resin component decreases and a weight concentration of the ultrafine particle component increases with increasing distance from the light diffusing fine particles:

$$|n_p - n_A| < |n_p - n_B| \qquad (1)$$

where $n_A$ represents the refractive index of the resin component of the matrix, $n_B$ represents the refractive index of the ultrafine particle component of the matrix, and $n_p$ represents the refractive index of the light diffusing fine particles.

18 Claims, 10 Drawing Sheets

U.S. PATENT DOCUMENTS

| | | | |
|---|---|---|---|
| 6,002,464 A * | 12/1999 | Fujisawa et al. | 349/64 |
| 6,417,831 B2 | 7/2002 | Kashima | |
| 6,852,396 B1 | 2/2005 | Mineo | |
| 7,656,580 B2 | 2/2010 | Chang | |
| 7,813,038 B2 | 10/2010 | Inoue et al. | |
| 8,018,145 B2 | 9/2011 | Hosoda et al. | |
| 8,062,395 B2 | 11/2011 | Yi et al. | |
| 2002/0068156 A1 | 6/2002 | Suzuki et al. | |
| 2007/0019131 A1 | 1/2007 | Choi et al. | |
| 2007/0103786 A1 | 5/2007 | Muramatsu | |
| 2007/0127127 A1 | 6/2007 | Hsu et al. | |
| 2007/0229804 A1 | 10/2007 | Inoue et al. | |
| 2007/0243710 A1 | 10/2007 | Yi et al. | |
| 2008/0030860 A1 | 2/2008 | Chang | |
| 2009/0051278 A1 | 2/2009 | Saneto et al. | |
| 2009/0128917 A1 | 5/2009 | Yoshinari et al. | |
| 2009/0142562 A1 | 6/2009 | Miyagawa et al. | |
| 2009/0195152 A1 | 8/2009 | Sawano | |
| 2010/0225229 A1 | 9/2010 | Hosoda et al. | |
| 2010/0283940 A1 | 11/2010 | Takemoto et al. | |

FOREIGN PATENT DOCUMENTS

| | | | |
|---|---|---|---|
| JP | 6-347616 A | 12/1994 | |
| JP | 6-347617 A | 12/1994 | |
| JP | 8-320406 A | 12/1996 | |
| JP | 10-253805 A | 9/1998 | |
| JP | 3071538 B2 | 7/2000 | |
| JP | 2002-196114 A | 7/2002 | |
| JP | 2002-212245 A | 7/2002 | |
| JP | 2003-262710 A | 9/2003 | |
| JP | 2003-307728 A | 10/2003 | |
| JP | 2004-38009 A | 2/2004 | |
| JP | 2005-215461 A | 8/2005 | |
| JP | 2005-309399 A | 11/2005 | |
| JP | 2007-148398 A | 6/2007 | |
| JP | 2007-293303 A | 11/2007 | |
| JP | 2009-70814 A | 4/2009 | |
| JP | 2009-187804 A | 8/2009 | |
| JP | 2009-533863 A | 9/2009 | |
| JP | 2009-244383 A | 10/2009 | |
| JP | 2009-259802 A | 11/2009 | |
| JP | 2009-276089 A | 11/2009 | |
| JP | 2010-15038 A | 1/2010 | |
| JP | 2010-49210 A | 3/2010 | |
| JP | 2010-205650 A | 9/2010 | |
| JP | 2010-250295 | * | 11/2010 |
| TW | M273010 U | 8/2005 | |
| TW | I261128 B | 9/2006 | |
| WO | 2007/032170 A1 | 3/2007 | |

OTHER PUBLICATIONS

Japanese Office Action dated Mar. 16, 2011, issued in corresponding Japanese Patent Application No. 2010-056575.
Supplementary European Search Report dated Feb. 7, 2012, issued in corresponding European Patent Application No. 10753482.8.
Taiwanese Office Action dated Oct. 31, 2011, issued in corresponding Taiwanese Patent Application No. 099108038.
International Search Report of PCT/JP2011/070818, date of mailing Dec. 6, 2011, with English translation (8 pages).
International Search Report of PCT/JP2011/071229, date of mailing Nov. 15, 2011, with English translation (5 pages).
International Search Report of PCT/JP2011/071230, date of mailing Nov. 8, 2011, with English translation (4 pages).
International Search Report of PCT/JP2011/071231, date of mailing Nov. 8, 2011, with English translation (3 pages).
International Search Report of PCT/JP2011/071232, date of mailing Nov. 1, 2011, with English translation (5 pages).
International Search Report of PCT/JP2011/071233, date of mailing Nov. 8, 2011, with English translation (5 pages).
Chinese Office Action dated Oct. 10, 2012, issued in corresponding Chinese Patent Application No. 201080012202.8, (11 pages). With English Translation.

* cited by examiner (a)

(b)

(c)

COMPARATIVE EXAMPLE 1

DARK PLACE   WHITE

LIGHT PLACE   BRACK (a): EXAMPLE 1
(b): COMPARATIVE EXAMPLE 2
(c): COMPARATIVE EXAMPLE 3

LIGHT DIFFUSING ELEMENT, POLARIZING PLATE WITH LIGHT DIFFUSING ELEMENT, LIQUID CRYSTAL DISPLAY APPARATUS USING BOTH, AND MANUFACTURING METHOD FOR LIGHT DIFFUSING ELEMENT

TECHNICAL FIELD

The present invention relates to a light diffusing element, a polarizing plate with a light diffusing element, and a liquid crystal display apparatus using both, and a manufacturing method for a light diffusing element.

BACKGROUND ART

A light diffusing element is widely used in illumination covers, screens for projection televisions, surface-emitting devices (for example, liquid crystal display apparatuses), and the like. In recent years, the light diffusing element has been used for enhancing the display quality of liquid crystal display apparatuses and the like and for improving viewing angle properties, for example. As the light diffusing element, for example, there is proposed a light diffusing element in which fine particles are dispersed in a matrix such as a resin sheet (see, for example, Patent Literature 1). In such light diffusing element, most of incident light scatters forward (output plane side), whereas a part thereof scatters backward (incident plane side). As a refractive index difference between the fine particles and the matrix becomes larger, diffusibility (for example, a haze value) increases. However, if the refractive index difference is large, backscattering increases. More specifically, there is proposed a technology for placing a light diffusing element on the top surface of a liquid crystal display apparatus so as to enhance the display quality of the liquid crystal display apparatus. However, such light diffusing element does not have sufficient light diffusibility (for example, a haze value of less than 90%), and dose not exert any sufficient effect of improving the display quality. On the other hand, in the case where a light diffusing element having large light diffusibility (for example, a haze value of 90% or more) is used in a liquid crystal display apparatus so as to enhance the display quality, when outside light is incident upon the liquid crystal device, a screen becomes whitish, resulting in a problem in that it is difficult to display a video and an image with a high contrast in a light place. This is because the fine particles in the light diffusing element cause the incident light to scatter backward as well as forward. According to the conventional light diffusing element, as a haze value becomes larger, backscattering increases. Therefore, it is very difficult to satisfy both the increase in light diffusibility and the suppression of backscattering. Further, in an illumination application, as a haze value becomes larger, backscattering increases and a total light transmittance decreases, which degrades light use efficiency.

As means for solving the above-mentioned problems, based on the concept of suppressing the reflection at an interface between the fine particles and the matrix, for example, there are proposed: core-shell fine particles, in which the refractive index of a core is different from that of a shell, and fine particles having gradient refractive indices, such as the so-called gradient index (GRIN) fine particles, in which the refractive index changes continuously from the center of the fine particles toward the outer side, are dispersed in a resin (see, for example, Patent Literatures 2 to 4). However, the productivity of these fine particles is insufficient due to the complicated production process thereof compared with that of ordinary fine particles, and thus, it is not practical to use these fine particles.

CITATION LIST

Patent Literature

[PTL 1] JP 3071538 B2
[PTL 2] JP 06-347617 A
[PTL 3] JP 2003-262710 A
[PTL 4] JP 2002-212245 A

SUMMARY OF INVENTION

Technical Problem

The present invention has been made in view of solving the above-described problems, and an object of the present invention is to provide a light diffusing element, which has a high haze value and strong diffusibility, has backscattering suppressed, and is low in cost and excellent in productivity.

Solution to Problem

A light diffusing element according to an embodiment of the present invention includes: a matrix containing a resin component and an ultrafine particle component; and light diffusing fine particles dispersed in the matrix, wherein: refractive indices of the resin component, the ultrafine particle component, and the light diffusing fine particles satisfy the below-indicated expression (1); and the light diffusing element includes a concentration adjusted area, which is formed in an outer portion of a vicinity of a surface of each of the light diffusing fine particles, and in which a weight concentration of the resin component decreases and a weight concentration of the ultrafine particle component increases with increasing distance from the light diffusing fine particles:

$$|n_P - n_A| < |n_P - n_B| \tag{1}$$

where $n_A$ represents the refractive index of the resin component of the matrix, $n_A$ represents the refractive index of the ultrafine particle component of the matrix, and $n_P$ represents the refractive index of the light diffusing fine particles.

In one embodiment of the invention, the light diffusing element further includes a second concentration adjusted area formed by permeation of the resin component to an inner portion of the vicinity of the surface of each of the light diffusing fine particles.

In one embodiment of the invention, the light diffusing element has a haze of 90% to 99%.

In one embodiment of the invention, the refractive indices of the resin component, the ultrafine particle component, and the light diffusing fine particles satisfy $0.01 \leq |n_P - n_A| \leq 0.10$ and $0.10 \leq |n_P - n_B| \leq 1.50$.

In one embodiment of the invention, the resin component and the light diffusing fine particles are formed of materials of the same type, and the ultrafine particle component is formed of a material of a different type from those of the resin component and the light diffusing fine particles.

In one embodiment of the invention, the resin component and the light diffusing fine particles are each formed of an organic compound, and the ultrafine particle component is formed of an inorganic compound.

In one embodiment of the invention, the light diffusing fine particles have an average particle diameter of 1 μm to 5 μm.

In one embodiment of the invention, the ultrafine particle component has an average particle diameter of 1 nm to 100 nm.

In one embodiment of the invention, the light diffusing element has a light diffusion half-value angle of 10° to 150°.

According to another aspect of the present invention, a polarizing plate with a light diffusing element is provided. The polarizing plate with a light diffusing element includes: the light diffusing element as described above; and a polarizer.

According to still another aspect of the present invention, a liquid crystal display apparatus is provided. The liquid crystal display apparatus includes: a liquid crystal cell; a collimated light source device, which emits collimated light to the liquid crystal cell; and the light diffusing element as described above, which transmits and diffuses the collimated light passing through the liquid crystal cell.

According to still another aspect of the present invention, a manufacturing method for the above-described light diffusing element is provided. The method includes the steps of: coating an application liquid, in which a resin component of a matrix or a precursor thereof, an ultrafine particle component, and light diffusing fine particles are dissolved or dispersed in a volatile solvent, onto a base material; and drying the application liquid coated onto the base material.

In one embodiment of the invention, the method further includes the steps of: bringing the precursor of the resin component into contact with the light diffusing fine particles in the application liquid; and allowing at least a part of the precursor to permeate an inner portion of the light diffusing fine particles.

In one embodiment of the invention, the bringing the precursor of the resin component into contact with the light diffusing fine particles in the application liquid is carried out for a period of time longer than that required for a particle diameter of each of the light diffusing fine particles to become substantially maximum.

In one embodiment of the invention, the permeation step includes allowing the precursor to permeate in a range of 10% or more and 95% or less of an average particle diameter of the light diffusing fine particles from the surface of each of the light diffusing fine particles.

In one embodiment of the invention, the method further includes the step of polymerizing the precursor after the coating step.

In one embodiment of the invention, the polymerization step includes polymerizing the precursor that permeates the inner portion of the light diffusing fine particles and the precursor that does not permeate the light diffusing fine particles simultaneously, thereby forming the second concentration adjusted area in the inner portion of the vicinity of the surface of each of the light diffusing fine particles and simultaneously forming the matrix and the first concentration adjusted area.

In one embodiment of the invention, the resin component includes an ionizing radiation-curable resin, and the precursor of the resin component is polymerized by irradiating the precursor with ionizing radiation.

Advantageous Effects of Invention

According to the present invention, by using a combination of a matrix containing a particular resin component and an ultrafine particle component, and particular light diffusing fine particles, the concentration adjusted area can be formed around the light diffusing fine particles. As a result, a refractive index can be changed in stages or substantially continuously in the vicinity of an interface between the matrix and the light diffusing fine particles (typically, in an outer portion of the vicinity of the surface of each of the light diffusing fine particles), the reflection at the interface between the matrix and the light diffusing fine particles can be suppressed, and backscattering can be suppressed. Further, by allowing the matrix to contain a particular ultrafine particle component, the refractive index difference between the matrix and the light diffusing fine particles can be enlarged. Due to these synergistic effects, a light diffusing element, which has a high haze value and strong diffusibility, and has backscattering suppressed, can be realized. Further, according to the present invention, the concentration adjusted area can be formed without using fine particles with a special structure which is required to be manufactured by a complicated manufacturing method, and hence, the light diffusing element is also very excellent in productivity and cost.

In one embodiment, in addition to the above-mentioned concentration adjusted area, the second concentration adjusted area can be formed in an inner portion of the vicinity of the surface of each of light diffusing fine particles by allowing a resin component to permeate the light diffusing fine particles. As a result, an area in which a refractive index can be changed in stages or substantially continuously is further enlarged. Therefore, the reflection at the interface between the matrix and the light diffusing fine particles can be suppressed further satisfactorily, and backscattering can be further suppressed. Moreover, when the resin component permeates the inner portion of the light diffusing fine particles, the concentration of the ultrafine particle component in the matrix can be increased. Therefore, a refractive index difference between the matrix and the light diffusing fine particles can be further increased. Thus, by further forming the second concentration adjusted area in the inner portion of the vicinity of the surface of each of the light diffusing fine particles, the above-mentioned effects of the present invention can be further promoted.

DESCRIPTION OF EMBODIMENTS

Hereinafter, preferred embodiments of the present invention are described with reference to the drawings. However, the present invention is not limited to these specific embodiments.

A. Light Diffusing Element
A-1. Entire Construction

Figure 1A:
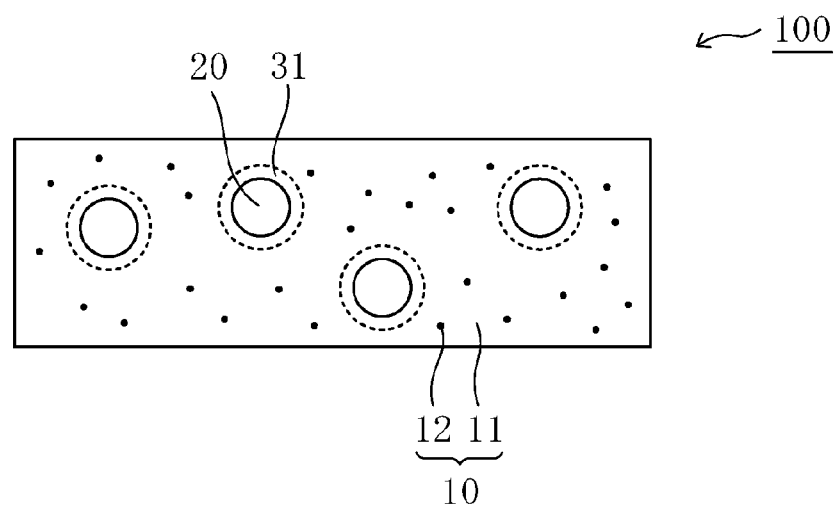
FIG. 1A is a schematic view for illustrating a dispersed state of a resin component and an ultrafine particle component of a matrix and light diffusing fine particles in a light diffusing element according to a preferred embodiment of the present invention.
Figure 1B:
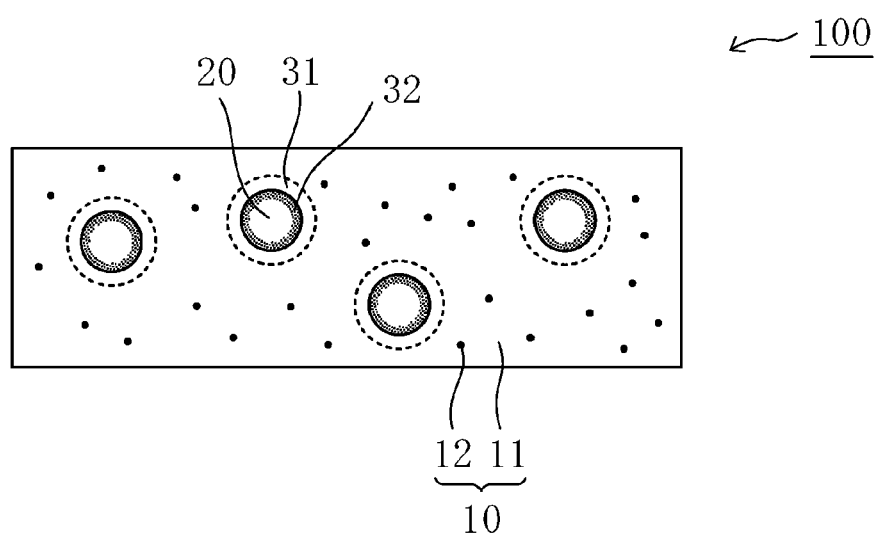
FIG. 1B is a schematic view for illustrating a dispersed state of a resin component and an ultrafine particle component of a matrix and light diffusing fine particles in a light diffusing element according to another embodiment of the present invention.

A light diffusing element of the present invention includes a matrix containing a resin component and an ultrafine particle component, and light diffusing fine particles dispersed in the matrix. The light diffusing element of the present invention expresses a light diffusing function due to the refractive index difference between the matrix and the light diffusing fine particles. FIGS. 1A and 1B are each a schematic view for illustrating a dispersed state of a resin component and an ultrafine particle component of a matrix, and light diffusing fine particles in a light diffusing element according to a preferred embodiment of the present invention. A light diffusing element 100 of the present invention includes a matrix 10 containing a resin component 11 and an ultrafine particle component 12, and light diffusing fine particles 20 dispersed in the matrix 10. The refractive indices of the resin component and the ultrafine particle component of the matrix, and the light diffusing fine particles satisfy the following expression (1).

$$|n_P - n_A| < |n_P - n_B| \quad (1)$$

In the expression (1), $n_A$ represents the refractive index of the resin component of the matrix, $n_B$ represents the refractive index of the ultrafine particle component of the matrix, and $n_P$ represents the refractive index of the light diffusing fine particles. Further, in the present invention, the refractive indices of the resin component, the ultrafine particle component, and the light diffusing fine particles can also satisfy the following expression (2).

$$|n_P - n_A| < |n_P - n_B| \quad (2)$$

In one embodiment, as shown in FIG. 1A, the light diffusing element of the present invention has a concentration adjusted area 31 formed in an outer portion of the vicinity of the surface of each light diffusing fine particle 20. In another embodiment, as shown in FIG. 1B, the light diffusing element of the present invention further has a second concentration adjusted area 32 formed by permeation of the resin component 11 to an inner portion of the vicinity of the surface of each light diffusing fine particle 20. In this description, for convenience, the concentration adjusted area 31 in the outer portion of the vicinity of the surface of the light diffusing fine particle 20 may be referred to as first concentration adjusted area.

In the case where only the first concentration adjusted area 31 is formed as shown in FIG. 1A, $|n_P - n_A|$ in the above-mentioned expression (1) is preferably 0.0 to 0.1, more preferably 0.0 to 0.06, particularly preferably more than 0 and 0.06 or less. When $|n_P - n_A|$ is more than 0.1, backscattering may increase. In the case where the first concentration adjusted area 31 and the second concentration adjusted area 32 are formed as shown in FIG. 1B, $|n_P - n_A|$ in the above-mentioned expression (1) is preferably 0.01 to 0.10, more preferably 0.01 to 0.06, particularly preferably 0.02 to 0.06. When $|n_P - n_A|$ is less than 0.01, the second concentration adjusted area may not be formed. When $|n_P - n_A|$ is more than 0.10, backscattering may increase. Irrespective of whether the second concentration adjusted area 32 is formed, $|n_P - n_B|$ is preferably 0.10 to 1.50, more preferably 0.20 to 0.80. When $|n_P - n_B|$ is less than 0.10, the haze becomes 90% or less in most cases, and as a result, light from a light source cannot be diffused sufficiently in the case where the light diffusing element is incorporated in a liquid crystal display apparatus, and a viewing angle may become small. When $|n_P - n_B|$ is more than 1.50, backscattering may increase. Further, irrespective of whether the second concentration adjusted area 32 is formed, $|n_A - n_B|$ is preferably 0.10 to 1.50, more preferably 0.20 to 0.80. When $|n_A - n_B|$ is less than 0.10, sufficient light diffusibility may not be obtained. When $|n_A - n_B|$ is more than 1.50, the wavelength dispersions of $n_A$ and $n_B$ increase, and the color tone of scattering light may not be neutral. As described above, by using the resin component of the matrix and the light diffusing fine particles, the refractive indices of which are close to each other, and an ultrafine particle component whose refractive index is largely different from those of the resin component and the light diffusing fine particles in combination, backscattering can be suppressed while a high haze is being kept, together with the effects brought about by the first concentration adjusted area and the second concentration adjusted area described later.

Figure 2:
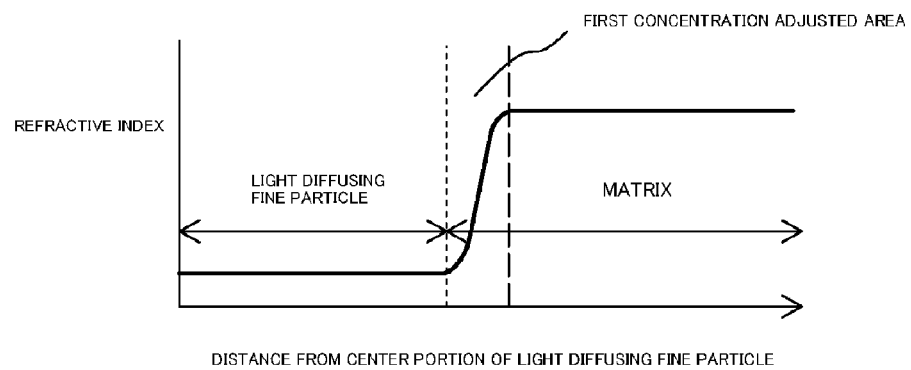
FIG. 2(a) is a conceptual view for explaining a change in a refractive index from a center portion of a light diffusing fine particle to a matrix in the light diffusing element of FIG. 1A.
FIG. 2(b) is a conceptual view for explaining a change in a refractive index from a center portion of a light diffusing fine particle to a matrix in the light diffusing element of FIG. 1B.
FIG. 2(c) is a conceptual view for explaining a change in a refractive index from a center portion of a fine particle to a matrix in a conventional light diffusing element.
Figure 2:
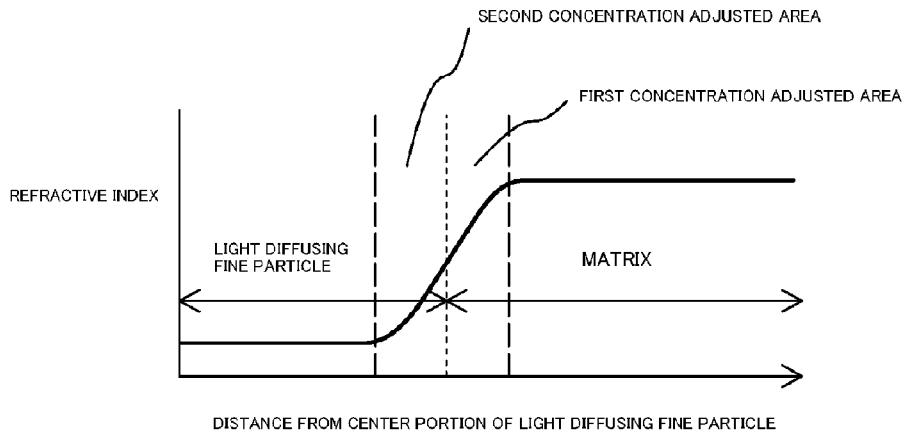
Figure 2:
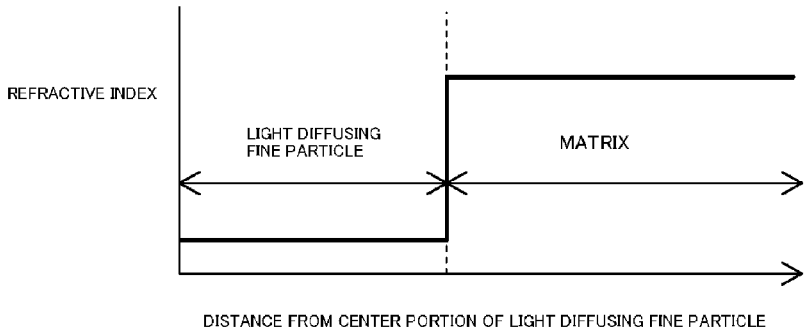

In the first concentration adjusted area 31, the weight concentration of the resin component 11 becomes lower and the weight concentration of the ultrafine particle component 12 becomes higher with increasing distance from the light diffusing fine particle 20. In other words, in an area closest to the light diffusing fine particle 20 of the first concentration adjusted area 31, the ultrafine particle component 12 is dispersed at a relatively low concentration, and the concentration of the ultrafine particle component 12 increases with increasing distance from the light diffusing fine particle 20. For example, in the area closest to the light diffusing fine particle 20 of the first concentration adjusted area 31, the weight concentration of the resin component is higher than the average weight concentration of the resin component in the entire matrix, and the weight concentration of the ultrafine particle component is lower than the average weight concentration of the ultrafine particle component in the entire matrix. On the other hand, in an area farthest from the light diffusing fine particle 20 of the first concentration adjusted area 31, the weight concentration of the resin component is equal to, or in some cases, lower than the average weight concentration of the resin component in the entire matrix, and the weight concentration of the ultrafine particle component is equal to, or in some cases, higher than the average weight concentration of the ultrafine particle component in the entire matrix. Due to the formation of such first concentration adjusted area, the refractive index can be changed in stages or substantially continuously in the vicinity of the interface (a circumferential portion of the light diffusing fine particle 20, that is, an outer portion of the vicinity of the surface of the light diffusing fine particle) between the matrix 10 and the light diffusing fine particle 20 (see FIG. 2(a)). On the other hand, in the conventional light diffusing element, such first concentration adjusted area is not formed, and the interface between the fine particle and the matrix is clear. Therefore, the refractive index changes discontinuously from the refractive index of the fine particles to the refractive index of the matrix (see FIG. 2(c)). As shown in FIG. 2(a), by forming the first concentration adjusted area 31 to change the refractive index in stages or substantially continuously in the vicinity of the interface (in an outer portion of the vicinity of the surface of the light diffusing fine particle 20) between the matrix 10 and the light diffusing fine particle 20, even when the refractive index difference between the matrix 10 and the light diffusing fine particle 20 is increased, the reflection at the interface between the matrix 10 and the light diffusing fine particle 20 can be suppressed, and backscattering can be suppressed. Further, on an outer side of the first concentration adjusted area 31, the weight concentration of the ultrafine particle component 12 whose refractive index is largely different from that of the light diffusing fine particle 20 becomes relatively high. Therefore, the refractive index difference between the matrix 10 and the light diffusing fine particle 20 can be increased. As a result, even a thin film can realize a high haze (strong diffusibility). Thus, according to the light diffusing element of the present invention, by forming such first concentration adjusted area, backscattering can be suppressed remarkably while increasing a refractive index difference to realize a high haze. Such feature is particularly preferred in an application that requires strong diffusibility (haze of 90% or more) such as a light diffusing element used in a collimated backlight front diffusing system. On the other hand, as shown in FIG. 2(c), according to the conventional light diffusing element, when an attempt is made to give strong diffusibility (high haze value) by increasing a refractive index difference, the gap between refractive indices at an interface cannot be eliminated. Consequently, backscattering caused by interface reflection increases, which may result in that a black display may not become black sufficiently (that is, a black color may get out of harmony).

The thickness of the first concentration adjusted area 31 (distance from the surface of the light diffusing fine particle to the end of the first concentration adjusted area) may be constant (that is, the first concentration adjusted area may spread to the circumference of the light diffusing fine particle in a concentric circle shape), or the thickness may vary depending upon the position of the surface of the light diffusing fine particle (for example, the first concentration adjusted area may have a contour shape of a candy called confetti). Preferably, the thickness of the first concentration adjusted area 31 may vary depending upon the position of the surface of the light diffusing fine particle. With such construction, the refractive index can be changed more continuously in the vicinity of the interface between the matrix 10 and the light diffusing fine particle 20. As long as the first concentration adjusted area 31 is formed with a sufficient thickness, the refractive index can be changed more smoothly and continuously in a circumferential portion of the light diffusing fine particle, and backscattering can be suppressed very effectively. On the other hand, when the thickness is too large, the first concentration adjusted area occupies an area in which the light diffusing fine particle should be originally present, and sufficient light diffusibility (for example, a haze value) may not be obtained. Thus, the thickness of the first concentration adjusted area 31 is preferably 10 nm to 500 nm, more preferably 20 nm to 400 nm, still more preferably 30 nm to 300 nm. Further, the thickness of the first concentration adjusted area 31 is preferably 10% to 50%, more preferably 20% to 40% with respect to the average particle diameter of the light diffusing fine particle.

The second concentration adjusted area 32 is formed by permeation of the resin component 11 to an inner portion of the light diffusing fine particle 20. Virtually, a precursor (typically, a monomer) of the resin component 11 permeates an inner portion of the light diffusing fine particle 20 to be polymerized, and thus, the second concentration adjusted area 32 is formed. In one embodiment, the weight concentration of the resin component 11 is substantially constant in the second concentration adjusted area 32. In another embodiment, in the second concentration adjusted area 32, the weight concentration of the resin component 11 becomes lower with increasing distance from the surface of the light diffusing fine particle 20 (that is, toward the center of the light diffusing fine particle 20). The second concentration adjusted area 32 exhibits its effect as long as the second concentration adjusted area 32 is formed inside the light diffusing fine particle 20. For example, the second concentration adjusted area 32 is formed in the range of preferably 10% to 95% of an average particle diameter of the light diffusing fine particle from the surface of the light diffusing fine particle 20. The thickness of the second concentration adjusted area 32 (distance from the surface of the light diffusing fine particle to the innermost portion of the second concentration adjusted area) may be constant or may vary depending upon the position of the surface of the light diffusing fine particle. The thickness of the second concentration adjusted area 32 is preferably 100 nm to 4 µm, more preferably 100 nm to 2 µm. When the resin component 11 permeates an inner portion of the light diffusing fine particle to form the second concentration adjusted area 32, the following effects can be obtained: (1) the formation of the above-mentioned first concentration adjusted area 31 can be accelerated; (2) a concentration adjusted area is also formed in an inner portion of the light diffusing fine particle, and thus, an area in which the refractive index is changed in stages or substantially continuously can be enlarged (that is, the refractive index can be changed in stages or substantially continuously from the second concentration adjusted area on an inner side of the light diffusing fine particle to the first concentration adjusted area on an outer side of the light diffusing fine particle: see FIG. 2(b)). As a result, compared with the case where only the first concentration adjusted area is formed on an outer side of the light diffusing fine particle, backscattering can be further suppressed; (3) the resin component 11 permeates an inner portion of the light diffusing fine particle 20, and thus, the concentration of a resin component in the matrix 10 becomes lower compared with the case where the resin component does not permeate the inner portion of the light diffusing fine particle. As a result, the contribution of the refractive index of the ultrafine particle component 12 with respect to the refractive index of the entire matrix 10 increases, and hence, the refractive index of the entire matrix becomes large in the case where the refractive index of the ultrafine particle component is large (on the contrary, the refractive index of the entire matrix becomes small in the case where the refractive index of the ultrafine particle component is small), and the refractive index difference between the matrix and the light diffusing fine particle becomes larger. Thus, compared with the case where the resin component does not permeate the inner portion of the light diffusing fine particle, higher diffusibility (haze value) can be realized. In addition, compared with the case where the resin component does not permeate the inner portion of the light diffusing fine particle, sufficient diffusibility can be realized even with a smaller thickness.

The first concentration adjusted area and second concentration adjusted area can each be formed by selecting appropriately the constituent material and chemical and thermodynamic properties of the resin component, the ultrafine particle component of the matrix, and the light diffusing fine particle. For example, by forming the resin component and the light diffusing fine particles from materials of the same type (e.g., organic compounds), and forming the ultrafine particle component from a material (e.g., an inorganic compound) of a different type from those of the matrix and the light diffusing fine particles, the first concentration adjusted area can be formed satisfactorily. Further, for example, by forming the resin component and the light diffusing fine particles from materials that are highly compatible among materials of the same type, the second concentration adjusted area can be formed satisfactorily. The thickness and the concentration gradient of the first concentration adjusted area and the second concentration adjusted area can be controlled by adjusting the chemical and thermodynamic properties of the resin component and the ultrafine particle component of the matrix and the light diffusing fine particles. It should be noted that the term "same type" as used herein means that the chemical structures and properties are identical or similar to each other, and the term "different type" refers to one other than the same type. Whether materials are of the same type or not may vary depending upon ways to select standards. For example, in the case where materials are selected based on an organic or inorganic material, organic compounds are compounds of the same type, and an organic compound and an inorganic compound are compounds of different types. In the case where materials are selected based on a repeating unit of a polymer, for example, an acrylic polymer and an epoxy-based polymer are compounds of different types, although they are organic compounds. In the case where materials are selected based on the periodic table, an alkali metal and a transition metal are elements of different types, although they are inorganic elements.

Figure 3:
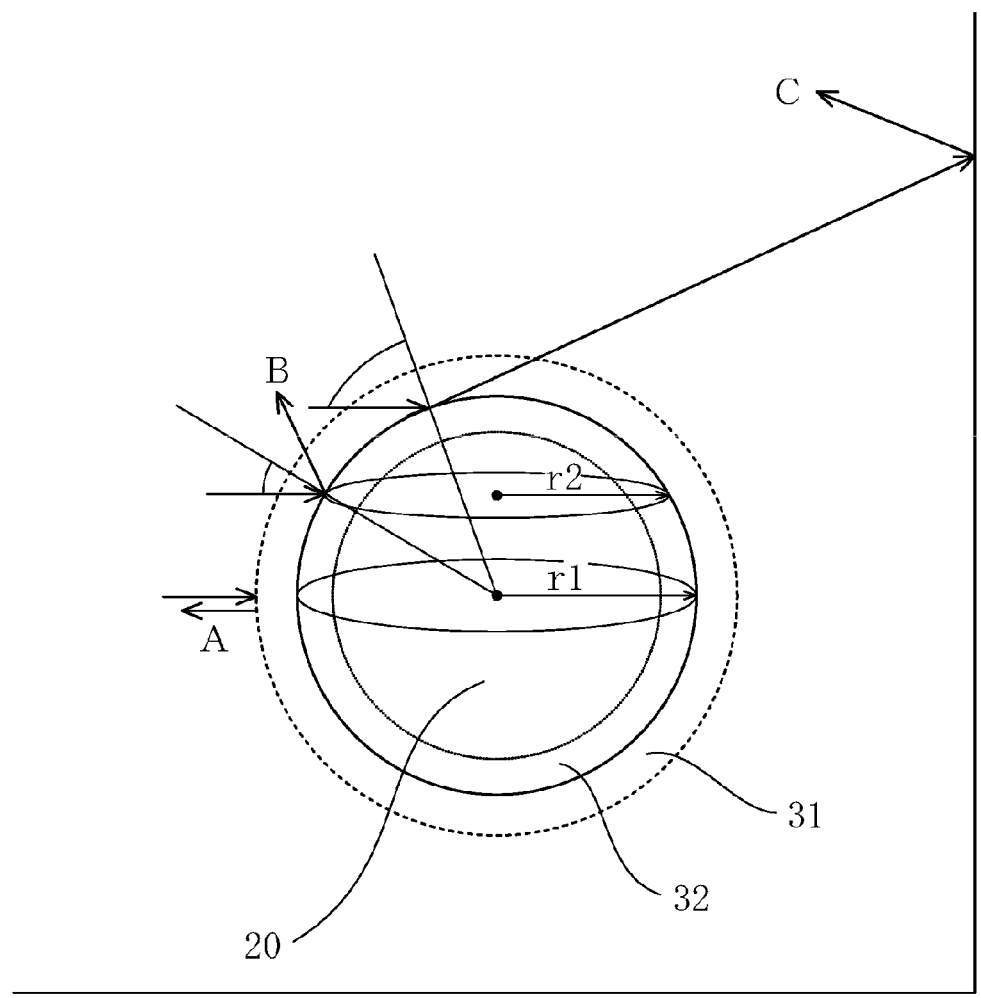
FIG. 3 is a schematic view showing a relationship between r1 and r2 in light diffusing fine particles used in the present invention.

The first concentration adjusted area 31 and second concentration adjusted area 32 are appropriately formed at such positions that, when a radius of each of the light diffusing fine particles is defined as r1 and a radius of a cross-section parallel to the maximum cross-section (plane including the radius of each of the light diffusing particles) of each of the light diffusing fine particles is defined as r2, a ratio of r2 to r1 is preferably 20% to 80%, more preferably 40% to 60%, still more preferably about 50%. By appropriately forming the first concentration adjusted area 31 and the second concentration adjusted area 32, if required, at such positions, the interface reflection of incident light (hereinafter, referred to as lateral incident light) with a large incident angle with respect to a radial direction of the light diffusing fine particles can be suppressed satisfactorily. FIG. 3 schematically shows the relationship between r1 and r2. More specifically, backscattering caused by the interface reflection between the matrix and the light diffusing fine particles is roughly classified into three kinds as shown in FIG. 3. That is, the backscattering is classified into the interface reflection light of front incidence (arrow A of FIG. 3), the interface reflection light of lateral incident light scattering backward (arrow B of FIG. 3), and the interface reflection light of lateral incident light that scatters forward but scatters backward without being output from the light diffusing element due to the total reflection (arrow C of FIG. 3). The lateral incident light has a reflectance higher than that of front incident light based on the Snell's law, and hence, backscattering can be reduced more efficiently by suppressing the interface reflection of lateral incident light. Thus, it is preferred that a concentration adjusted area be formed at such a position that the backscattering of lateral incident light can be reduced effectively. When r2 is too small, light reflected at such position is transmitted forward without reaching a critical angle. Therefore, the effect of reducing backscattering is not significantly influenced in most cases.

It is preferred that the light diffusing element has a higher haze. Specifically, the haze is preferably 90% to 99%, more preferably 92% to 99%, still more preferably 95% to 99%, particularly preferably 97% to 99%. When the haze is 90% or more, the light diffusing element can be preferably used as a front light diffusing element in a collimated backlight front diffusing system. It should be noted that the collimated backlight front diffusing system refers to a system in which a front light diffusing element is provided on a viewer side of an upper polarizing plate and collimated backlight (backlight with a narrow brightness half-width collected in a predetermined direction) is used in a liquid crystal display apparatus.

The diffusion property of the light diffusing element is preferably 10° to 150° (5° to 75° on one side), more preferably 10° to 100° (5° to 50° on one side), still more preferably 30° to 80° (15° to 40° on one side) in terms of a light diffusion half-value angle.

The thickness of the light diffusing element can be set appropriately depending upon purposes and desired diffusion property. Specifically, the thickness of the light diffusing element is preferably 4 μm to 50 μm, more preferably 4 μm to 20 μm. According to the present invention, a light diffusing element having a very high haze as described above in spite of such very small thickness can be obtained.

The light diffusing element is used preferably in a liquid crystal display apparatus, particularly preferably in a collimated backlight front diffusing system. The light diffusing element may be provided as a film-shaped or plate-shaped member alone, or may be attached to any appropriate base material or polarizing plate and provided as a composite member. Further, a reflection preventing layer may be laminated on the light diffusing element.

A-2. Matrix

As described above, the matrix 10 includes the resin component 11 and the ultrafine particle component 12. As shown in FIGS. 1A and 1B, the ultrafine particle component 12 is dispersed in the resin component 11 so as to form the first concentration adjusted area 31 around the light diffusing fine particle 20.

A-2-1. Resin Component

The resin component 11 is formed of any suitable material as long as the first concentration adjusted area, and if required, the second concentration adjusted area are formed satisfactorily, and the refractive indices satisfy the relationship of the above-mentioned expression (1). Preferably, as described above, the resin component 11 is formed of a compound that is of the same type as that of the light diffusing fine particles and that is of a different type from that of the ultrafine particle component. Thus, the first concentration adjusted area can be formed satisfactorily in the vicinity of the interface between the matrix and the light diffusing fine particles (in an outer portion of the vicinity of the surface of each of the light diffusing fine particles). More preferably, the resin component 11 is formed of a compound having high compatibility among those of the same type as that of the light diffusing fine particles. Thus, the second concentration adjusted area 32 can be formed satisfactorily in an inner portion of the vicinity of the surface of each of the light diffusing fine particles 20, if required. More specifically, the resin component is a material of the same type as that of the light diffusing fine particles, and hence a precursor thereof (typically, a monomer) can permeate the inner portion of the light diffusing fine particles. As the result of the polymerization of the precursor, the second concentration adjusted area with the resin component can be formed inside the light diffusing fine particles. Further, locally in the vicinity of the light diffusing fine particles, when only the resin component surrounds the light diffusing fine particles, the energy of the entire system becomes stable, compared with the case where the ultrafine particle component is uniformly dissolved or dispersed in the resin component. As a result, the weight concentration of the resin component becomes higher than the average weight concentration of the resin component in the entire matrix, and becomes lower with increasing distance from the light diffusing fine particles, in an area closest to the light diffusing fine particles. Thus, the first concentration adjusted area 31 can be formed in an outer portion of (around) the vicinity of the surface of the light diffusing fine particles.

The resin component is formed of preferably an organic compound, more preferably an ionizing radiation-curable resin. The ionizing radiation-curable resin is excellent in hardness of a coating film, and hence easily compensates for mechanical strength, which is a weak point of the ultrafine particle component described later. Examples of the ionizing radiation include UV light, visible light, infrared light, and electron beam. Of those, UV light is preferred, and thus, the resin component is particularly preferably formed of a UV-curable resin. Examples of the UV-curable resin include radical-polymerizable monomers and oligomers such as an acrylate resin (epoxy acrylate, polyester acrylate, acrylic acrylate, or ether acrylate). A monomer component (precursor) that constructs the acrylate resin preferably has a molecular weight of 200 to 700. Specific examples of the monomer component (precursor) that constructs the acrylate resin include pentaerythritol triacrylate (PETA, molecular weight: 298), neopentylglycol diacrylate (NPGDA, molecular weight: 212), dipentaerythritol hexaacrylate (DPHA, molecular weight: 632), dipentaerythritol pentaacrylate (DPPA, molecular weight: 578), and trimethylolpropane triacrylate (TMPTA, molecular weight: 296). Such monomer component (precursor) is preferred due to its molecular weight and steric structure suitable for permeation to a cross-linked structure (three-dimensional network structure) of the light diffusing fine particles. If required, an initiator may be added. Examples of the initiator include a UV radical generator (e.g., Irgacure 907, 127, or 192 manufactured by Ciba Specialty Chemicals) and benzoyl peroxide. The resin component may contain another resin component other than the above-mentioned ionizing radiation-curable resin. The another resin component may be an ionizing radiation-curable resin, a thermosetting resin, or a thermoplastic resin. Typical examples of the another resin component include an aliphatic (for example, polyolefin) resin and a urethane-based resin. In the case of using the another resin component, the kind and blending amount thereof are adjusted so that the first concentration adjusted area, and if required, the second concentration adjusted area are formed satisfactorily, and the refractive indices satisfy the relationship of the above-mentioned expression (1).

The refractive index of the resin component is preferably 1.40 to 1.60.

The blending amount of the resin component is preferably 20 parts by weight to 80 parts by weight, more preferably 45 parts by weight to 65 parts by weight with respect to 100 parts by weight of the matrix.

A-2-2. Ultrafine Particle Component

As described above, the ultrafine particle component 12 is formed of preferably a compound of a different type from those of the resin component described above and the light diffusing fine particles described later, more preferably an inorganic compound. Preferred examples of the inorganic compound include a metal oxide and a metal fluoride. Specific examples of the metal oxide include zirconium oxide (zirconia) (refractive index: 2.19), aluminum oxide (refractive index: 1.56 to 2.62), titanium oxide (refractive index: 2.49 to 2.74), and silicon oxide (refractive index: 1.25 to 1.46). Specific example of the metal fluoride include magnesium fluoride (refractive index: 1.37) and calcium fluoride (refractive index: 1.40 to 1.43). These metal oxides and metal fluorides absorb less light and each have a refractive index which is difficult to be expressed with organic compounds such as the ionizing radiation-curable resin and the thermoplastic resin. Therefore, the weight concentration of the ultrafine particle component becomes relatively higher with increasing distance from the interface with the light diffusing fine particles, and thus, the metal oxides and metal fluorides can change the refractive index largely. By setting a refractive index difference between the light diffusing fine particles and the matrix to be large, a high haze can be realized even with a thin film, and the effect of preventing backscattering is large because the first concentration adjusted area is formed. Zirconium oxide is a particularly preferred inorganic compound. This is because zirconium oxide has a large refractive index difference from the light diffusing fine particles, and has appropriate dispersibility with respect to the resin component, which enables the first concentration adjusted area 31 to be formed in a desirable manner.

The refractive index of the ultrafine particle component is preferably 1.40 or less or 1.60 or more, more preferably 1.40 or less or 1.70 to 2.80, particularly preferably 1.40 or less or 2.00 to 2.80. When the refractive index is more than 1.40 or less than 1.60, the refractive index difference between the light diffusing fine particles and the matrix becomes insufficient, and in the case where the light diffusing element is used in a liquid crystal display apparatus adopting a collimated backlight front diffusing system, light from a collimated backlight cannot be dispersed enough, which may narrow a viewing angle.

The refractive index may be decreased by porosifying the ultrafine particle component.

The average particle diameter of the ultrafine particle component is preferably 1 nm to 100 nm, more preferably 10 nm to 80 nm, still more preferably 20 nm to 70 nm. As described above, by using the ultrafine particle component with an average particle diameter smaller than the wavelength of light, geometric reflection, refraction, and scattering are not caused between the ultrafine particle component and the resin component, and a matrix that is optically uniform can be obtained. As a result, a light diffusing element that is optically uniform can be obtained.

It is preferred that the ultrafine particle component has satisfactory dispersibility with the resin component. The term "satisfactory dispersibility" as used herein means that a coating film, which is obtained by coating an application liquid containing the resin component, the ultrafine particle component (if required, a small amount of a UV initiator), and a volatile solvent, followed by removing the solvent by drying, is transparent.

Preferably, the ultrafine particle component is subjected to surface modification. By conducting surface modification, the ultrafine particle component can be dispersed satisfactorily in the resin component, and the first concentration adjusted area can be formed satisfactorily. As surface modification means, any suitable means can be adopted as long as the effect of the present invention is obtained. Typically, the surface modification is conducted by coating a surface modifier onto the surface of an ultrafine particle component to form a surface modifier layer. Preferred specific examples of the surface modifier include coupling agents such as a silane-based coupling agent and a titanate-based coupling agent, and a surfactant such as a fatty acid-based surfactant. By using such surface modifier, the wettability between the resin component and the ultrafine particle component is enhanced, the interface between the resin component and the ultrafine particle component is stabilized, the ultrafine particle component is dispersed satisfactorily in the resin component, and the first concentration adjusted area can be formed satisfactorily.

The blending amount of the ultrafine particle component is preferably 10 parts by weight to 70 parts by weight, more preferably 35 parts by weight to 55 parts by weight with respect to 100 parts by weight of the matrix.

A-3. Light Diffusing Fine Particles

The light diffusing fine particles 20 are also formed of any suitable material, as long as the first concentration adjusted area, and if required, the second concentration adjusted area are formed satisfactorily, and the refractive indices satisfy the relationship of the above-mentioned expression (1). Preferably, as described above, the light diffusing fine particles 20 are formed of a compound of the same type as that of the resin component of the matrix. For example, in the case where the ionizing radiation-curable resin that constructs the resin component of the matrix is an acrylate-based resin, it is preferred that the light diffusing fine particles be also constructed of the acrylate-based resin. More specifically, when the monomer component of the acrylate-based resin that constructs the resin component of the matrix is, for example, PETA, NPGDA, DPHA, DPPA, and/or TMPTA as described above, the acrylate-based resin that constructs the light-diffusing fine particles is preferably polymethyl methacrylate (PMMA), polymethyl acrylate (PMA), or a copolymer thereof, or a cross-linked product thereof. A copolymerizable component for each of PMMA and PMA is, for example, polyurethane, polystyrene (PSt), or a melamine resin. Particularly preferably, the light diffusing fine particles are constructed of PMMA. This is because the relationship in refractive index and thermodynatic properties with respect to the resin component of the matrix and the ultrafine particle component is suitable. Further, preferably, the light diffusing fine particles have a cross-linked structure (three-dimensional network structure). The light diffusing fine particles having a cross-linked structure are capable of being swollen. Thus, such light diffusing fine particles allow a precursor of a resin component having suitable compatibility to permeate an inner portion thereof satisfactorily, unlike dense or solid inorganic particles, and can satisfactorily form the second concentration adjusted area, if required. The cross-linking density of the light diffusing fine particles is preferably small (rough) to such a degree that a desired permeation range (described later) is obtained. For example, the swelling degree of the light diffusing fine particles at the time of coating an application liquid described later with respect to the resin component precursor (which may contain a solvent) is preferably 110% to 200%. Here, the term "swelling degree" refers to a ratio of an average particle diameter of the particles in a swollen state with respect to the average particle diameter of the particles before being swollen.

The average particle diameter of the light diffusing fine particles is preferably 1.0 μm to 5.0 μm, more preferably 1.0 μm to 4.0 μm, still more preferably 1.5 μm to 3.0 μm. The average particle diameter of the light diffusing fine particles is preferably ½ or less (for example, ½ to 1/20) of the thickness of the light diffusing element. As long as the light diffusing fine particles have an average particle diameter having such ratio with respect to the thickness of the light diffusing element, a plurality of light diffusing fine particles can be arranged in a thickness direction of the light diffusing element. Therefore, while incident light is passing through the light diffusing element, the incident light can be diffused in a multiple manner, and consequently, sufficient light diffusibility can be obtained.

The standard deviation of a weight average particle diameter distribution of the light diffusing fine particles is preferably 1.0 μm or less, more preferably 0.5 μm or less. When the light diffusing fine particles each having a small particle diameter with respect to the weight average particle diameter are present in a large number, the diffusibility may increase too much to suppress backscattering satisfactorily. When the light diffusing fine particles each having a large particle diameter with respect to the weight average particle diameter are present in a large number, a plurality of the light diffusing fine particles cannot be arranged in a thickness direction of the light diffusing element, and multiple diffusion may not be obtained. As a result, the light diffusibility may become insufficient.

As the shape of the light diffusing fine particles, any suitable shape can be adopted depending upon the purpose. Specific examples thereof include a spherical shape, a scalelike shape, a plate shape, an oval shape, and an amorphous shape. In most cases, spherical fine particles can be used as the light diffusing fine particles.

The refractive index of the light diffusing fine particles is preferably 1.30 to 1.70, more preferably 1.40 to 1.60.

The blending amount of the light diffusing fine particles is preferably 10 parts by weight to 100 parts by weight, more preferably 15 parts by weight to 40 parts by weight with respect to 100 parts by weight of the matrix. For example, by allowing the light diffusing fine particles having an average particle diameter in the above-mentioned preferred range to be contained in such blending amount, a light diffusing element having very excellent light diffusibility can be obtained.

A-4. Manufacturing Method for Light Diffusing Element

A manufacturing method for a light diffusing element according to the present invention includes the steps of: coating an application liquid, in which a resin component or a precursor thereof and an ultrafine particle component of a matrix, and light diffusing fine particles are dissolved or dispersed in a volatile solvent, onto a base material (defined as Step A); and drying the application liquid coated onto the base material (defined as Step B).

(Step A)

The resin component or precursor thereof, the ultrafine particle component, and the light diffusing fine particles are as described in the above-mentioned sections A-2-1, A-2-2, and A-3. Typically, the application liquid is a dispersion in which the ultrafine particle component and the light diffusing fine particles are dispersed in the precursor and the volatile solvent. As means for dispersing the ultrafine particle component and the light diffusing fine particles, any suitable means (for example, ultrasound treatment) can be adopted.

Any suitable solvent can be adopted as the volatile solvent as long as the solvent can dissolve or uniformly disperse each component described above. Specific examples of the volatile solvent include ethyl acetate, butyl acetate, isopropyl acetate, 2-butanone (methyl ethyl ketone), methyl isobutyl ketone, cyclopentanone, toluene, isopropyl alcohol, n-butanol, cyclopentane, and water.

The application liquid can further contain any suitable additive depending upon the purpose. For example, in order to disperse the ultrafine particle component satisfactorily, a dispersant can be preferably used. Other specific examples of the additive include an antioxidant, a modifying agent, a surfactant, a discoloration inhibitor, a UV absorbing agent, a leveling agent, and an antifoaming agent.

The blending amount of each component described above in the application liquid is as described in the above-mentioned sections A-2 to A-3. The solid content of the application liquid can be adjusted so as to be preferably about 10% by weight to 70% by weight. With such solid content, an application liquid having a viscosity that facilitates coating can be obtained.

Any suitable film can adopted as the base material as long as the effects of the present invention can be provided. Specific examples thereof include a triacetyl cellulose (TAC) film, a polyethylene terephthalate (PET) film, a polypropylene (PP) film, a nylon film, an acrylic film, and a lactone-modified acrylic film. The base material may be subjected to surface modification such as adhesion enhancing treatment, or may include an additive such as a lubricant, an antistat, or a UV absorbing agent, as required. The base material may function as a protective layer in a polarizing plate with a light diffusing element described later.

Any suitable method using a coater can be adopted as a method of coating the application liquid onto the base material. Specific examples of the coater include a bar coater, a reverse coater, a kiss coater, a gravure coater, a die coater, and a comma coater.

(Step B)

As the method of drying the application liquid, any suitable method can be adopted. Specific examples thereof include natural drying, drying by heating, and drying under reduced pressure. Drying by heating is preferred. The heating temperature is, for example, 60° C. to 150° C., and the heating time is, for example, 30 seconds to 5 minutes.

As described above, a light diffusing element as shown in FIG. 1A is formed on a base material.

In the case of forming the second concentration adjusted area inside the light diffusing fine particles as shown in FIG. 1B, the manufacturing method of the present invention further includes, in Step A, the steps of bringing the precursor of the resin component described above into contact with the light diffusing fine particles in the application liquid (defined as Step A-1), and allowing at least a part of the precursor to permeate an inner portion of the light diffusing fine particles (defined as Step A-2).

(Step A-1)

If the precursor of the resin component described above is contained in the application liquid, the contact between the precursor and the light diffusing fine particles can be realized without special treatments or operations.

(Step A-2)

As means for allowing at least apart of the precursor to permeate an inner portion of the light diffusing fine particles in Step A-2, typically, there is given means including allowing the application liquid to stand still. As the resin component and the light diffusing fine particles are formed of preferably materials of the same type, more preferably materials having high compatibility with each other, the precursor (monomer) of the resin component is allowed to permeate an inner portion of the light diffusing fine particles by allowing the application liquid to stand still, even without any special treatments or operations. Specifically, by bringing the precursor of the resin component into contact with the light diffusing fine particles for a predetermined period of time, the precursor of the resin component permeates the inner portion of the light diffusing fine particles. The still standing time is preferably longer than a time in which the particle diameter of each of the light diffusing fine particles becomes substantially maximum. Here, the "time in which the particle diameter of each of the light diffusing fine particles becomes substantially maximum" refers to a time in which the light diffusing fine particles are each swollen to a maximum degree and are not swollen any more (that is, an equilibrium state) (hereinafter, also referred to as maximum swelling time). By bringing the precursor of the resin component into contact with the light diffusing fine particles over a period of time longer than the maximum swelling time, the permeation of the resin component precursor into the light diffusing fine particles is saturated, and the precursor is not taken in the cross-linking structure inside the light diffusing fine particles any more. As a result, the second concentration adjusted area can be formed satisfactorily and stably in a polymerization step described later. The maximum swelling time can vary depending upon the compatibility between the resin component and the light diffusing fine particles. Thus, the still standing time can vary depending upon the constituent materials for the resin component and the light diffusing fine particles. For example, the still standing time is preferably 1 to 48 hours, more preferably 2 to 40 hours, still more preferably 3 to 35 hours, particularly preferably 4 to 30 hours. When the still standing time is less than 1 hour, the precursor may not permeate the inner portion of the light diffusing fine particles sufficiently, and as a result, the second concentration adjusted area may not be formed satisfactorily. When the still standing time exceeds 48 hours, due to the physical interaction among the light diffusing fine particles, the light diffusing fine particles coagulate to increase the viscosity of the application liquid, which may render the coating property insufficient. Still standing may be conducted at room temperature, or under predetermined temperature conditions set in accordance with the purpose and materials to be used.

In Step A-2, the precursor has only to permeate a part of the light diffusing fine particles from the surfaces of the light diffusing fine particles, and for example, permeates preferably in a range of 10% to 95% of the average particle diameter. When the permeation range is less than 10%, the second concentration adjusted area may not be formed satisfactorily and backscattering may not be reduced sufficiently. Even when the permeation range exceeds 95%, the second concentration adjusted area may not be formed satisfactorily and backscattering may not be reduced sufficiently in the same way as in the case where the permeation range is small. The permeation range can be controlled by adjusting the materials for the resin component and the light diffusing fine particles, the cross-linking density of the light diffusing fine particles, the still standing time, the still standing temperature, or the like.

Figure 4:
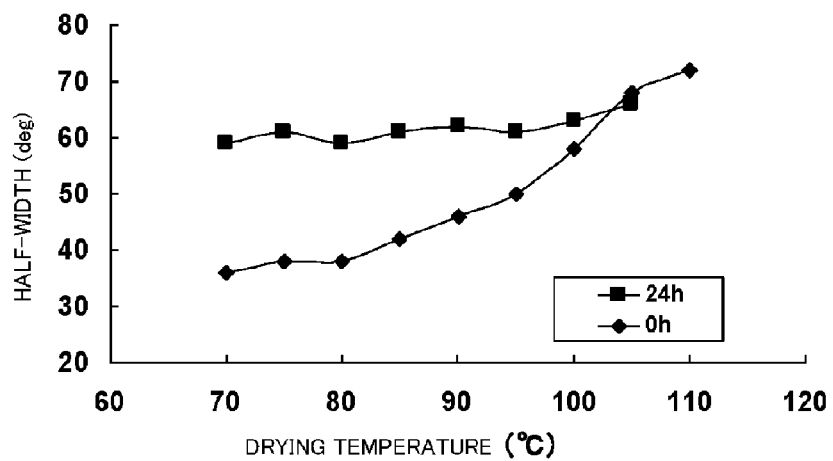
FIG. 4 is a graph showing a relationship between a dry temperature and a diffusion half-value angle to be obtained, regarding application liquids whose still standing times are different from each other.

In this embodiment, it is important to control the permeation of the precursor into the light diffusing fine particles. For example, as shown in FIG. 4, in the case of forming a light diffusing element by coating the application liquid to a base material immediately after preparing the application liquid, a diffusion half-value angle largely varies depending upon the drying temperature. On the other hand, in the case of forming a light diffusing element by coating the application liquid to a base material after allowing the application liquid to stand still for, for example, 24 hours, the diffusion half-value angle remains almost constant irrespective of the drying temperature. The reason for this is considered as follows: the precursor permeates the light diffusing fine particles to a saturated state due to the still standing, and hence, the formation of the concentration adjusted area is not influenced by the drying temperature. Thus, as described above, the still standing time is preferably longer than the maximum swelling time. By setting the still standing time as such, a satisfactory diffusion half-value angle that remains almost constant irrespective of the dying time can be obtained, and hence, a light diffusing element with high diffusibility can be produced stably without variations. Further, a light diffusing element can be manufactured by drying at a low temperature of 60° C., for example, and this is preferred in terms of safety and cost. On the other hand, if the time required for the permeation to reach a saturated state can be determined depending upon the kinds of the precursor and the light diffusing fine particles, a light diffusing element with high diffusibility can be produced stably without variations even when shortening the still standing time, by selecting the drying temperature appropriately. For example, even in the case of forming a light diffusing element by coating the application liquid to a base material immediately after preparing the application liquid, a light diffusing element with high diffusibility can be produced stably without variations by setting the drying temperature to be 100° C. More specifically, if the light diffusing fine particles, the precursor of the resin component, and the drying conditions are selected appropriately, the second concentration adjusted area can be formed even without taking the still standing time.

As described above, in each of Steps A-1 and A-2, special treatments or operations are not required, and hence, it is not necessary to set a timing for coating an application liquid precisely.

(Step C)

In the case of forming the second concentration adjusted area, the manufacturing method further includes preferably the step of polymerizing the above-mentioned precursor after the application step (Step C). As the polymerization method, any suitable method can be adopted depending upon the kind of the resin component (thus, the precursor thereof). For example, in the case where the resin component is an ionizing radiation-curable resin, the precursor is polymerized by emitting ionizing radiation. In the case of using UV light as the ionizing radiation, the integrated light quantity is preferably 200 mJ to 400 mJ. The transmittance of the ionizing radiation with respect to the light diffusing fine particles is preferably 70% or more, more preferably 80% or more. Further, for example, in the case where the resin component is a thermosetting resin, the precursor is polymerized by heating. The heating temperature and the heating time can be set appropriately depending upon the kind of the resin component. Preferably, the polymerization is conducted by emitting ionizing radiation. The ionizing radiation can cure a coating film while keeping the refractive index distribution structure (concentration adjusted area) satisfactorily, and hence, a light diffusing element with satisfactory diffusing properties can be manufactured. By polymerizing the precursor, the second concentration adjusted area 32 is formed in an inner portion of the vicinity of the surface of the light diffusing fine particles 20, and the matrix 10 and the first concentration adjusted area 31 are formed. More specifically, the second concentration adjusted area 32 is formed when the precursor having permeated an inner portion of the light diffusing fine particles 20 is polymerized, and the matrix 10 is formed when the precursor that has not permeated the light diffusing fine particles 20 is polymerized with the ultrafine particle component dispersed therein. The first concentration adjusted area 31 can be formed mainly based on the compatibility among the resin component, the ultrafine particle component, and the light diffusing fine particles. That is, according to the manufacturing method of this embodiment, by polymerizing both the precursor that has permeated an inner portion of the light diffusing fine particles and the precursor that has not permeated the light diffusing fine particles simultaneously, the second concentration adjusted area 32 is formed in an inner portion of the vicinity of the surface of the light diffusing fine particles 20, and at the same time, the matrix 10 and the first concentration adjusted area 31 can be formed.

The polymerization step (Step C) may be conducted before the drying step (Step B) or after Step B.

It should be appreciated that the manufacturing method for a light diffusing element of the present invention can include, in addition to Steps A to C, any suitable steps, treatments and/or operations at any suitable times. The kind of such steps and the like and the time when such steps and the like are conducted can be set appropriately depending upon the purpose.

As described above, the light dispersing element as described in the sections A-1 to A-3 is formed on a base material. The obtained light diffusing element may be used after being peeled from the base material for use as a single member, or may be used as a light diffusing element with a base material. Alternatively, the obtained light diffusing element may be transferred from the base material onto a polarizing plate or the like for use as a composite member (for example, a polarizing plate with a light diffusing element), or may be attached to a polarizing plate or the like together with the base material for use as a composite member (for example, a polarizing plate with a light diffusing element). In the case where the light diffusing element is attached to a polarizing plate or the like together with the base material for use as a composite member (for example, a polarizing plate with a light diffusing element), the base material can function as a protective layer for the polarizing plate. The light diffusing element of the present invention can be used, for example, in a member for a backlight of a liquid crystal display apparatus and a diffusing member for illumination equipment (for example, an organic EL, LED), in addition to the viewer side diffusing element of a liquid crystal display apparatus adopting the collimated backlight front diffusing system described above.

B. Polarizing Plate with Light Diffusing Element

B-1. Entire Construction of a Polarizing Plate with a Light Diffusing Element

Figure 5:
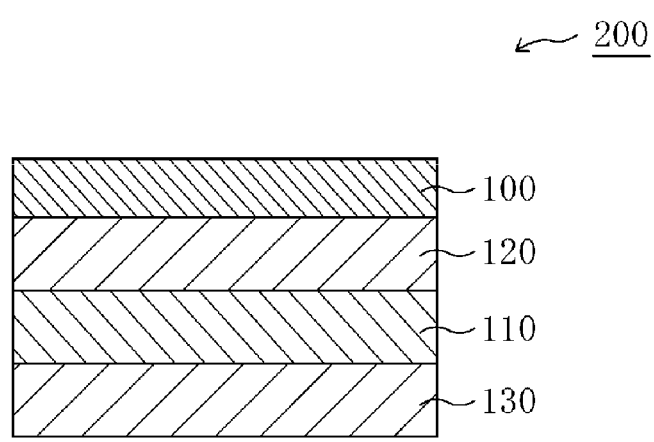
FIG. 5 is a schematic cross-sectional view of a polarizing plate with a light diffusing element according to a preferred embodiment of the present invention.

A polarizing plate with a light diffusing element of the present invention is typically placed on a viewer side of a liquid crystal display apparatus. FIG. 5 is a schematic cross-sectional view of a polarizing plate with a light diffusing element according to a preferred embodiment of the present invention. A polarizing plate with a light diffusing element 200 in the figure includes a light diffusing element 100 and a polarizer 110. The light diffusing element 100 is the light diffusing element of the present invention described in the above-mentioned sections A-1 to A-4. The light diffusing element 100 is disposed so as to be placed at a position closest to a viewer side when the polarizing plate with a light diffusing element is placed on the viewer side of the liquid crystal display apparatus. In one embodiment, a low reflective layer or a reflection preventing treatment layer (anti-reflection treatment layer) is placed on the viewer side of the light diffusing element 100 (not shown). In the example shown in the figure, the polarizing plate with a light diffusing element 200 includes protective layers 120 and 130 on both sides of the polarizer. The light diffusing element, the polarizer, and the protective layers are attached to each other via any suitable adhesive layer or pressure-sensitive adhesive layer. At least one of the protective layers 120 and 130 may be omitted depending upon the purpose, the construction of the polarizing plate, and the construction of the liquid crystal display apparatus. For example, in the case where a base material used for forming the light diffusing element can function as a protective layer, the protective layer 120 may be omitted. The polarizing plate with a light diffusing element of the present invention can be used particularly suitably as a viewer side polarizing plate in a liquid crystal display apparatus adopting a collimated backlight front diffusing system.

B-2. Polarizer

Any appropriate polarizer can be adopted as the above-mentioned polarizer 110 depending on purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based aligned film such as a dehydrated polyvinyl alcohol film or a dehydrochlorinated polyvinyl chloride film. Of those, a polarizer prepared by adsorbing a dichromatic substance such as iodine on a polyvinyl alcohol-based film and uniaxially stretching the film is particularly preferred because of high polarized dichromaticity. The thickness of the polarizer is not particularly limited, but is generally about 1 to 80 μm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like if necessary, or the polyvinyl alcohol-based film may be immersed in an aqueous solution of potassium iodide or the like. Further, the polyvinyl alcohol-based film may be immersed and washed in water before coloring if necessary.

Washing the polyvinyl alcohol-based film with water not only allows removal of contamination on a film surface or washing away of an antiblocking agent, but also provides an effect of preventing unevenness such as uneven coloring by swelling the polyvinyl alcohol-based film. The stretching of the film may be performed after coloring of the film with iodine, performed during coloring of the film, or performed followed by coloring of the film with iodine. The stretching may be performed in an aqueous solution of boric acid or potassium iodide, or in a water bath.

B-3. Protective Layer

The protective layers 120 and 130 are each formed of any appropriate film which can be used as a protective layer for a polarizing plate. As a material used as a main component of the film, there are specifically exemplified a cellulose-based resin such as triacetylcellulose (TAC), and transparent resins such as a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, a (meth)acrylic resin, and an acetate-based resin. Further, there are exemplified a (meth)acrylic, urethane-based, (meth) acrylic urethane-based, epoxy-based, or silicone-based thermosetting resin or UV-curable resin. Still further, there are exemplified a glassy polymer such as a siloxane-based polymer. In addition, a polymer film described in JP 2001-343529 A (WO 01/37007) may also be used. Specifically, the film is formed of a resin composition containing a thermoplastic resin having a substituted or unsubstituted imide group on a side chain, and a thermoplastic resin having a substituted or unsubstituted phenyl group and a nitrile group on a side chain. A specific example thereof is a resin composition containing an alternate copolymer of isobutene and N-methylmaleimide, and an acrylonitrile/styrene copolymer. The polymer film may be an extruded product of the above-mentioned resin composition, for example.

The protective layer (internal protective layer) 130 is preferred to have optical isotropy. Specifically, a thickness direction retardation Rth(550) of the internal protective layer is preferably in a range of −20 nm to +20 nm, more preferably in a range of −10 nm to +10 nm, particularly preferably in a range of −6 nm to +6 nm, most preferably in a range of −3 nm to +3 nm. An in-plane retardation Re(550) of the internal protective layer is preferably 0 nm or more and 10 nm or less, more preferably 0 nm or more and 6 nm or less, particularly preferably 0 nm or more and 3 nm or less. The film for forming the protective layer having the optical isotropy is described in detail in JP 2008-180961 A and the description is herein incorporated by reference.

C. Liquid Crystal Display Apparatus

Figure 6:
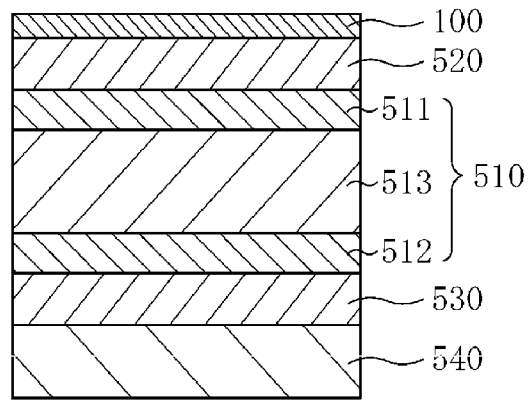
FIG. 6 is a schematic cross-sectional view of a liquid crystal display apparatus according to a preferred embodiment of the present invention.

FIG. 6 is a schematic cross-sectional view of a liquid crystal display apparatus according to a preferred embodiment of the present invention. A liquid crystal display apparatus 500 includes a liquid crystal cell 510, polarizing plates 520 and 530 placed on both sides of the liquid crystal cell, a backlight unit 540 provided on an outer side of the polarizing plate 530, and the light diffusing element 100 provided on an outer side (viewer side) of the polarizing plate 520. Any suitable optical compensation plate (retardation plate) can be placed between the liquid crystal cell 510 and the polarizing plates 520 and/or 530 depending upon the purpose. The liquid crystal cell 510 includes a pair of substrates (typically, glass substrates) 511 and 512, and a liquid crystal layer 513 containing a liquid crystal as a display medium, placed between the substrates 511 and 512.

The light diffusing element 100 is the light diffusing element of the present invention described in the above-mentioned sections A-1 to A-4. Alternatively, the polarizing plate with a light diffusing element of the present invention described in the above-mentioned section B may be placed instead of the light diffusing element 100 and the viewer side polarizing plate 520. The light diffusing element transmits and diffuses light (typically, collimated light as described later) having passed through the liquid crystal cell.

The backlight unit 540 is a collimated light source device for emitting collimated light to the liquid crystal cell 510. The backlight unit may have any suitable construction capable of emitting the collimated light. For example, the backlight unit includes a light source and a condensing element for collimating light emitted from the light source (each of which is not shown). In this case, any suitable condensing element capable of collimating light emitted from the light source can be adopted as the condensing element. When the light source itself may emit the collimated light, the condensing element may be omitted. The followings are exemplified as a specific construction of the backlight unit (collimated light source device): (1) a construction in which a condensing element in which a light shielding layer or a reflective layer is provided in a portion except a lens focus, on a flat surface side of a lenticular lens or cannonball type lens is located on a liquid crystal cell side of a light source (for example, cold cathode fluorescent lamp) (for example, JP 2008-262012 A); (2) a construction which includes a side light type LED light source, a light guide plate, and a variable angle prism which has a convex surface formed on a light guide plate side and is provided on a liquid crystal cell side of the light guide plate (in this construction, anisotropic diffusing element may be further used if necessary; for example, JP 3442247 B2); (3) a construction in which a louver layer in which a light absorbing resin and a transparent resin are alternately formed in a stripe shape is provided between a backlight and a backlight-side polarizing plate (for example, JP 2007-279424 A); (4) a construction using a cannonball type LED as a light source (for example, JP 06-130255 A); and (5) a construction using a Fresnel lens and, if necessary, a diffusion plate (for example, JP 01-126627 A). The above-mentioned documents describing the detailed constructions are herein incorporated by reference.

The liquid crystal layer 513 preferably includes liquid crystal molecules that are vertically aligned during black display. Examples of a driving mode of the liquid crystal cell including such liquid crystal layer include a multi-domain vertical alignment (MVA) mode, a pattern VA (PVA) mode, a twisted nematic (TN) mode, an electrically controlled birefringence (ECB) mode, and a bend nematic (OCB: optically compensated bend) mode.

EXAMPLES

Hereinafter, the present invention is described in more detail by using examples. However, the present invention is not limited to the examples. The evaluation methods in the examples are as follows. In addition, unless otherwise stated, "part(s)" and "%" in the examples are by weight.

(1) Thickness of Light Diffusing Element

The total thickness of a base material and a light diffusing element was measured with a microgauge-type thickness meter (manufactured by Mitutoyo Corporation), and the thickness of the base material was subtracted from the total thickness to calculate the thickness of the light diffusing element.

(2) Presence or Absence of First Concentration Adjusted Area and Second Concentration Adjusted Area A laminate of the light diffusing element and the base material obtained in each of the examples and the comparative examples was sliced so as to have a thickness of 0.1 μm with a microtome while being cooled with liquid nitrogen to obtain a measurement sample. The state of fine particles in a light diffusing element portion of the measurement sample and the state of an interface between the fine particles and the matrix were observed with a transmission electron microscope (TEM). The case where the interface between the fine particles and the matrix was unclear was defined as "first concentration adjusted area is present," and the case where the interface between the fine particles and the matrix was clear was defined as "first concentration adjusted area is absent." Further, the case where a contrast caused by the permeation of a precursor in an inner portion of the fine particles was able to be confirmed was defined as "second concentration adjusted area is present," and the case where a contrast was not able to be confirmed in an inner portion of the fine particles and uniform color was recognized was defined as "second concentration adjusted area was absent."

(3) Haze

Measurement was performed with a haze meter ("HN-150" (trade name) manufactured by Murakami Color Research Laboratory Co., Ltd.) in accordance with a method specified in JIS 7136.

(4) Light Diffusion Half-Value Angle

Figure 7:
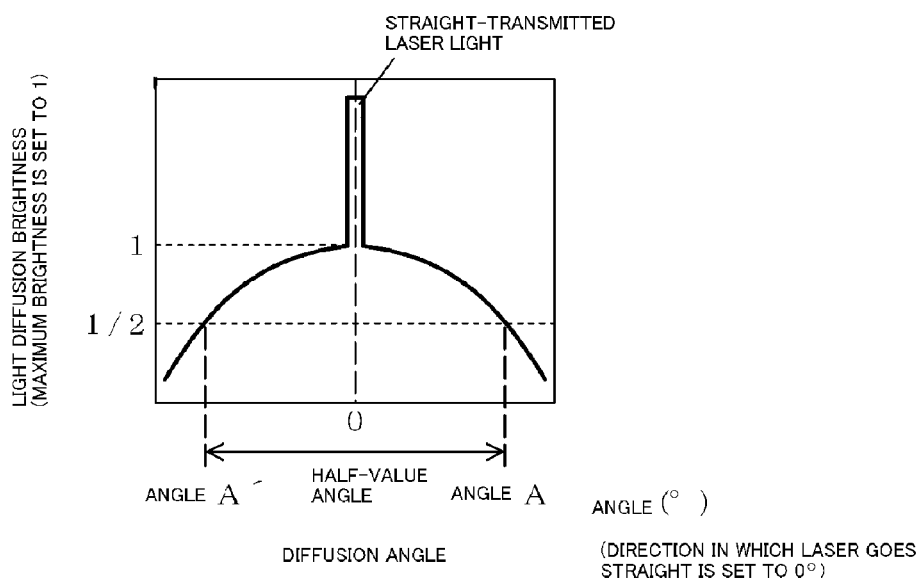
FIG. 7 is a schematic view for explaining a method of calculating a light diffusion half-value angle.

Laser light was emitted from the front of the light diffusing element. A diffusion intensity of diffused light at a diffusion angle was measured every 1° by a goniophotometer. As shown in FIG. 7, diffusion angles corresponding to a half of a maximum value of diffusion intensities of light beams other than straight-transmitted laser light beam were measured on both sides of a diffusion profile. A value obtained by adding the angles measured on both sides ("(angle A)+(angle A')" in FIG. 7) was set as the light diffusion half-value angle.

(5) Backscattering Ratio

The laminate of the light diffusing element and the base material obtained in each of the examples and the comparative examples was attached onto a black acrylic plate ("SUMIPEX" (trade name) (registered trademark), thickness: 2 mm, manufactured by Sumitomo Chemical Co., Ltd.) via a transparent pressure-sensitive adhesive to obtain a measurement sample. The integrated reflectance of the measurement sample was measured with a spectrophotometer ("U4100" (trade name) manufactured by Hitachi Ltd.). On the other hand, a laminate of a base material and a transparent coating layer was obtained as a control sample, using an application liquid in which fine particles were removed from the above-mentioned application liquid for a light diffusing element and the integral reflectance thereof (i.e., surface reflectance) was measured in the same way as described above. The integral reflectance (surface reflectance) of the control sample was subtracted from the integral reflectance of the measurement sample to calculate a backscattering ratio of the light diffusing element.

(6) Permeation Range of Precursor

Ten light diffusing fine particles were randomly selected from a TEM photograph taken in the procedure described in the above-mentioned item (2). The particle diameter of the light diffusing fine particles and the particle diameter in a portion (non-permeated portion) of the light diffusing fine particles in which the precursor had not permeated were measured for the respective selected light diffusing fine particles, and the permeation range was calculated by the following equation. The average of the ten light diffusing fine particles was defined as a permeation range.

(Permeation range)={1−(particle diameter of non-permeated portion/particle diameter of light diffusing fine particle)}×100(%)

Example 1

Production of Light Diffusing Element

Figure 8:
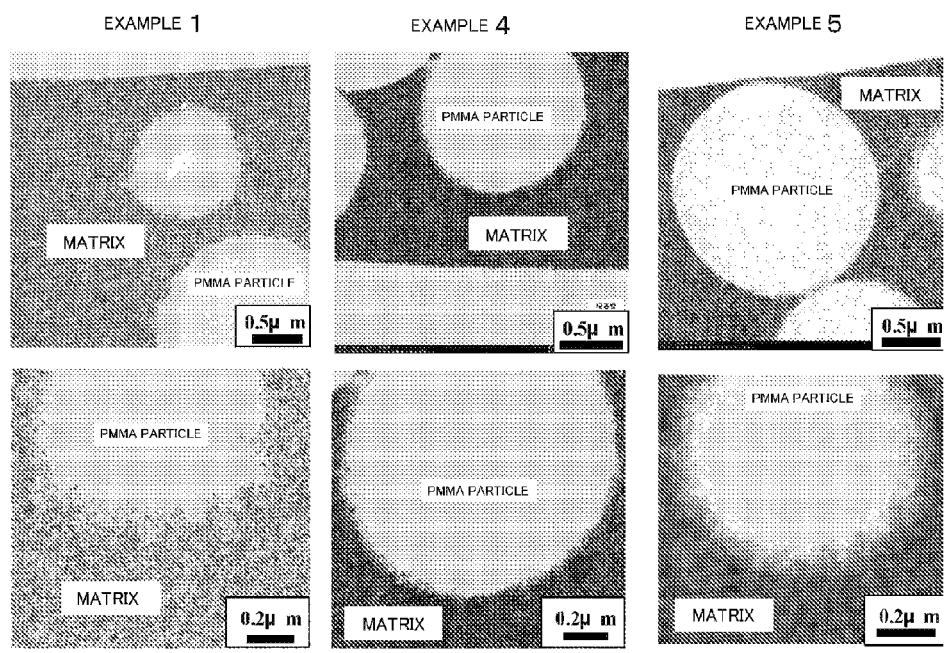
FIG. 8 is transmission photomicrographs in which the presence or absence of a concentration adjusted area is confirmed regarding light diffusing elements of Examples 1, 4, and 5.

To 18.2 parts of a hard coat resin ("Opstar KZ6661" (trade name) (containing MEK/MIBK) manufactured by JSR Corporation) containing 62% of zirconia nano particles (average particle diameter: 60 nm, refractive index: 2.19) as an ultrafine particle component, 6.8 parts of a 50% methyl ethyl ketone (MEK) solution of pentaerythritol triacrylate ("Biscoat #300" (trade name), refractive index: 1.52, manufactured by Osaka Organic Chemical Industry Ltd.) as a precursor of a resin component, 0.068 part of a photopolymerization initiator ("Irgacure 907" (trade name), manufactured by Ciba Specialty Chemicals), 0.625 part of a leveling agent ("GRANDIC PC 4100" (trade name), manufactured by DIC Corporation), and 2.5 parts of polymethyl methacrylate (PMMA) fine particles ("MX 180 TA" (trade name), average particle diameter: 1.8 μm, refractive index: 1.49, manufactured by Soken Chemical & Engineering Co., Ltd.) as light diffusing fine particles were added. This mixture was subjected to ultrasonic treatment for 5 minutes to prepare an application liquid in which the above-mentioned respective components were dispersed uniformly. The solid content of the application liquid was 54.5%. Immediately after the application liquid was prepared, the application liquid was applied onto a TAC film ("FUJITAC" (trade name), manufactured by Fuji Photo Film Co., Ltd.) with a bar coater, dried at 100° C. for one minute, and irradiated with UV light with an integrated light quantity of 300 mJ to obtain a light diffusing element with a thickness of 20 µm. The obtained light diffusing element was evaluated for the above-mentioned items (1) to (6). Table 1 shows the results together with the results of Examples 2 to 15 and Comparative Examples 1 to 4 to be described later. Further, FIG. 8 shows TEM photographs in each of which the presence or absence of a concentration adjusted area was confirmed. The concentration adjusted area was observed at a position where a ratio (r2/r1) of a radius (r2) of a TEM observation cross-section with respect to a radius (r1) of the light diffusing fine particles was 50%.

Example 4

Production of Light Diffusing Element

An application liquid was prepared in the same way as in Example 1, except that the hard coat resin containing 62% of zirconia nano particles (average particle diameter: 60 nm, refractive index: 2.19) as the ultrafine particle component was changed to "Opstar KZ 6676" (trade name) (containing MEK/MIBK) manufactured by JSR Corporation and that the precursor of the resin component was changed from pentaerythritol triacrylate to dipentaerythritol hexaacrylate ("NK ester" (trade name), manufactured by Shin-Nakamura Chemical Co., Ltd.). The solid content of the application liquid was 54.5%. The remaining procedure was conducted in the same way as in Example 1 to obtain a light diffusing element with a thickness of 20 µm. The obtained light diffusing element was evaluated for the above-mentioned items (1) to (6). Table 1 shows the results. Further, FIG. 8 shows TEM

TABLE 1

| | Thickness (µm) | First concentration adjusted area/thickness (nm) | Second concentration adjusted area/permeation range (%) | Swelling degree (%) | Still standing time (h) | Drying temperature (° C.) | Haze (%) | Diffusion half-value angle (°) | Back-scattering (%) |
|---|---|---|---|---|---|---|---|---|---|
| Example 1 | 20 | Present/140 | Absent | No change | Immediately after | 100 | 98.2 | 60 | 0.50 |
| Example 2 | 16 | Present/140 | Absent | No change | Immediately after | 100 | 98.0 | 45 | 0.19 |
| Example 3 | 4 | Present/140 | Absent | No change | Immediately after | 100 | 92.7 | 22 | 0.15 |
| Example 4 | 20 | Present/100 | Absent | No change | Immediately after | 100 | 98.1 | 54 | 0.48 |
| Example 5 | 20 | Present/300 | Absent | No change | Immediately after | 100 | 98.2 | 60 | 0.49 |
| Example 6 | 20 | Present/200 | Absent | No change | Immediately after | 100 | 98.2 | 61 | 0.47 |
| Example 7 | 20 | Present/100 | Absent | No change | Immediately after | 100 | 98.0 | 42 | 0.12 |
| Example 8 | 12 | Present/200 | Present/76.3 | 140 | Immediately after | 100 | 98.4 | 62 | 0.39 |
| Example 9 | 10 | Present/200 | Present/79.5 | 140 | 4 | 60 | 98.5 | 63 | 0.42 |
| Example 10 | 10 | Present/100 | Absent | No change | Immediately after | 60 | 95.4 | 32 | 0.19 |
| Example 11 | 10 | Present/150 | Present/64.9 | 120 | 2 | 60 | 97.7 | 45 | 0.31 |
| Example 12 | 10 | Present/200 | Present/81.3 | 140 | 7 | 60 | 98.5 | 63 | 0.43 |
| Example 13 | 10 | Present/200 | Present/81.5 | 140 | 24 | 60 | 98.5 | 63 | 0.45 |
| Example 14 | 10 | Present/300 | Present/29.1 | 110 | 24 | 60 | 98.5 | 62 | 0.39 |
| Example 15 | 15 | Present/50 | Absent | No change | Immediately after | 100 | 96.6 | 36 | 0.20 |
| Comparative Example 1 | 50 | Absent | Absent | No change | Immediately after | 150 | 98.7 | 72 | 1.35 |
| Comparative Example 2 | 10 | Absent | Absent | No change | Immediately after | 150 | 88.3 | 17 | 0.13 |
| Comparative Example 3 | 20 | Absent | Absent | No change | Immediately after | 100 | 97.8 | 40 | 1.52 |
| Comparative Example 4 | 13 | Absent | Absent | No change | Immediately after | 100 | 98.3 | 58 | 1.03 |

Example 2

Production of Light Diffusing Element

A light diffusing element with a thickness of 16 µm was obtained in the same way as in Example 1, except for changing the coating thickness of the application liquid. The obtained light diffusing element was evaluated for the above-mentioned items (1) to (6). Table 1 shows the results.

Example 3

Production of Light Diffusing Element

A light diffusing element with a thickness of 4 µm was obtained in the same way as in Example 1, except for changing the coating thickness of the application liquid. The obtained light diffusing element was evaluated for the above-mentioned items (1) to (6). Table 1 shows the results.

photographs in each of which the presence or absence of a concentration adjusted area was confirmed. The concentration adjusted area was observed at a position where r2/r1 was 66.7%.

Example 5

Production of Light Diffusing Element

An application liquid was prepared in the same way as in Example 1, except for changing the PMMA fine particles as the light diffusing fine particles to "XX131AA" (trade name) (average particle diameter: 2.5 µm, refractive index: 1.49) manufactured by Sekisui Plastics Co., Ltd. The solid content of the application liquid was 54.5%. The remaining procedure was conducted in the same way as in Example 1 to obtain a light diffusing element with a thickness of 20 µm. The obtained light diffusing element was evaluated for the above-mentioned items (1) to (6). Table 1 shows the results. Further, FIG. 8 shows TEM photographs in each of which the presence or absence of a concentration adjusted area was confirmed. The concentration adjusted area was observed at a position where r2/r1 was 32.0%.

Example 6

Production of Light Diffusing Element

Figure 9:
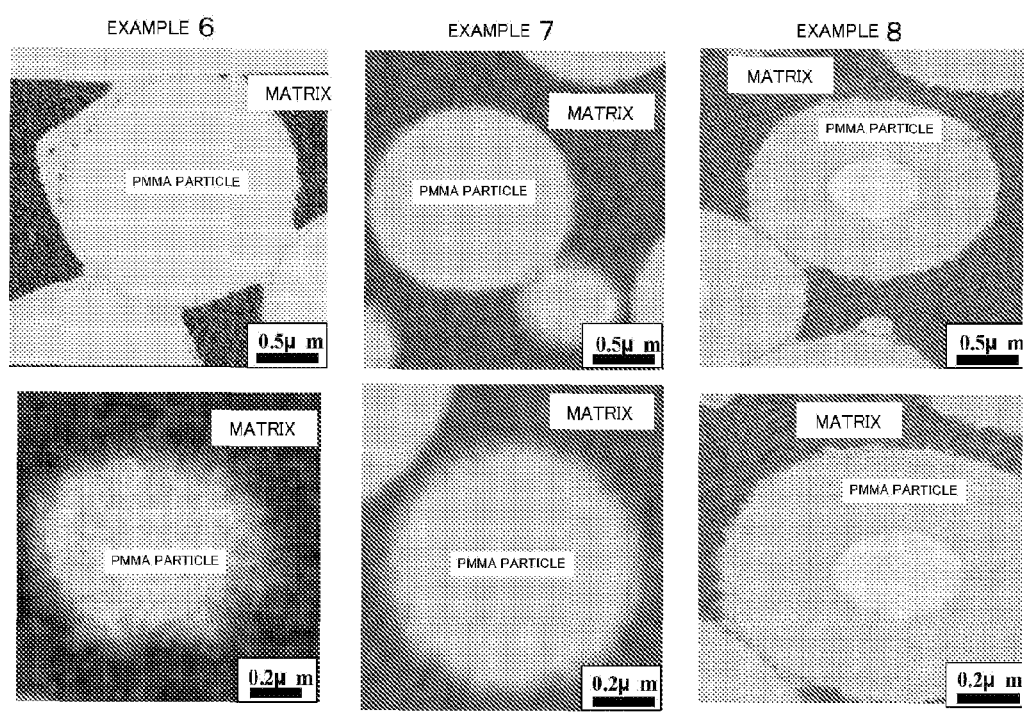
FIG. 9 is transmission photomicrographs in which the presence or absence of a concentration adjusted area is confirmed regarding light diffusing elements of Examples 6 to 8.

An application liquid was prepared in the same way as in Example 1, except for changing 6.8 parts of the 50% methyl ethyl ketone (MEK) solution of pentaerythritol triacrylate as the precursor of the resin component to 6.8 parts of a 50% toluene solution of pentaerythritol triacrylate. The solid content of the application liquid was 45%. The remaining procedure was conducted in the same way as in Example 1 to obtain a light diffusing element with a thickness of 20 μm. The obtained light diffusing element was evaluated for the above-mentioned items (1) to (6). Table 1 shows the results. Further, FIG. 9 illustrates TEM photographs in each of which the presence or absence of a concentration adjusted area was confirmed. The concentration adjusted area was observed at a position where r2/r1 was 50.0%.

Example 7

Production of Light Diffusing Element

To 10 parts of a slurry ("ZRMIBK35%-F83" (trade name), dispersion solvent: MIBK, manufactured by C. I. KASEI CO., LTD.) containing 35.5% of zirconia nano particles (average particle diameter: 30 nm, refractive index: 2.19) as an ultrafine particle component, 2.78 parts of pentaerythritol triacrylate ("Biscoat #300" (trade name), refractive index: 1.52, manufactured by Osaka Organic Chemical Industry Ltd.) as a precursor of a resin component, 0.03 part of a photopolymerization initiator ("Irgacure 907" (trade name), manufactured by Ciba Specialty Chemicals), 0.03 part of a leveling agent ("GRANDIC PC 4100" (trade name), manufactured by DIC Corporation), and 0.56 part of polymethyl methacrylate (PMMA) fine particles ("Art Pearl J-4P" (trade name), average particle diameter: 2.1 μm, refractive index: 1.49, manufactured by Negami Chemical Industrial Co., Ltd.) as light diffusing fine particles were added. Thus, an application liquid was prepared. The solid content of the application liquid was 45%. The remaining procedure was conducted in the same way as in Example 1 to obtain a light diffusing element with a thickness of 20 μm. The obtained light diffusing element was evaluated for the above-mentioned items (1) to (6). Table 1 shows the results. Further, FIG. 9 shows TEM photographs in each of which the presence or absence of a concentration adjusted area was confirmed. The concentration adjusted area was observed at a position where r2/r1 was 47.6%.

Example 8

Production of Light Diffusing Element

To 18.2 parts of a hard coat resin ("Opstar KZ6661" (trade name) (containing MEK/MIBK) manufactured by JSR Corporation) containing 62% of zirconia nano particles (average particle diameter: 60 nm, refractive index: 2.19) as an ultrafine particle component, 6.8 parts of a 50% methyl ethyl ketone (MEK) solution of pentaerythritol triacrylate ("Biscoat #300" (trade name), refractive index: 1.52, manufactured by Osaka Organic Chemical Industry Ltd.) as a precursor of a resin component, 0.068 part of a photopolymerization initiator ("Irgacure 907" (trade name), manufactured by Ciba Specialty Chemicals), 0.625 part of a leveling agent ("GRANDIC PC 4100" (trade name), manufactured by DIC Corporation), and 2.5 parts of polymethyl methacrylate (PMMA) fine particles ("Art Pearl J4P" (trade name), average particle diameter: 2.1 μm, refractive index: 1.49, manufactured by Negami Chemical Industrial Co., Ltd.) as light diffusing fine particles were added. This mixture was subjected to ultrasonic treatment for 5 minutes to prepare an application liquid in which the above-mentioned respective components were dispersed uniformly. Immediately after the application liquid was prepared, the application liquid was applied onto a TAC film ("FUJITAC" (trade name), manufactured by Fuji Photo Film Co., Ltd.) with a bar coater, dried at 100° C. for one minute, and irradiated with UV light with an integrated light quantity of 300 mJ to obtain a light diffusing element with a thickness of 12 μm. The obtained light diffusing element was evaluated for the above-mentioned items (1) to (6). Table 1 shows the results. Further, FIG. 9 shows TEM photographs in each of which the presence or absence of a concentration adjusted area was confirmed.

Example 9

Production of Light Diffusing Element

An application liquid was prepared in the same way as in Example 8. The application liquid was applied in the same way as in Example 8 after being allowed to stand still for 4 hours. A light diffusing element was obtained in the same way as in Example 8, except for setting the drying temperature after application to be 60° C. and setting the thickness to be 10 μm. The obtained light diffusing element was evaluated for the above-mentioned items (1) to (6). Table 1 shows the results.

Example 10

Production of Light Diffusing Element

A light diffusing element with a thickness of 10 μm was obtained in the same way as in Example 8, except for performing drying at 60° C. for one minute and setting the thickness of the application liquid to be 10 μm (that is, the application liquid was applied immediately after preparing the application liquid). The obtained light diffusing element was evaluated for the above-mentioned items (1) to (6). Table 1 shows the results.

Example 11

Production of Light Diffusing Element

A light diffusing element was obtained in the same way as in Example 9, except for setting the still standing time to be 2 hours. The obtained light diffusing element was evaluated for the above-mentioned items (1) to (6). Table 1 shows the results.

Example 12

Production of Light Diffusing Element

A light diffusing element was obtained in the same way as in Example 9, except for setting the still standing time to be 7 hours. The obtained light diffusing element was evaluated for the above-mentioned items (1) to (6). Table 1 shows the results.

Example 13

Production of Light Diffusing Element

A light diffusing element was obtained in the same way as in Example 9, except for setting the still standing time to be 24 hours. The obtained light diffusing element was evaluated for the above-mentioned items (1) to (6). Table 1 shows the results.

Example 14

Production of Light Diffusing Element

A light diffusing element was obtained in the same way as in Example 13, except for changing the PMMA fine particles as the light diffusing fine particles to "XX131AA" (trade name) (average particle diameter: 2.5 μm, refractive index: 1.49) manufactured by Sekisui Plastics Co., Ltd. The obtained light diffusing element was evaluated for the above-mentioned items (1) to (6). Table 1 shows the results.

Example 15

Production of Light Diffusing Element

An application liquid was prepared in the same way as in Example 1, except for changing the light diffusing fine particles to MMA-styrene (St) copolymer fine particles ("XX15AA" (trade name), average particle diameter: 2.9 μm, MMA/St ratio=70/30, refractive index: 1.52, manufactured by Sekisui Plastics Co., Ltd.). The solid content of the application liquid was 54.5%. The remaining procedure was conducted in the same way as in Example 1 to obtain a light diffusing element with a thickness of 20 μm. The obtained light diffusing element was evaluated for the above-mentioned items (1) to (6). Table 1 shows the results.

Comparative Example 1

A light diffusing element having a construction not containing an ultrafine particle component was manufactured by the following procedure.

Figure 10:
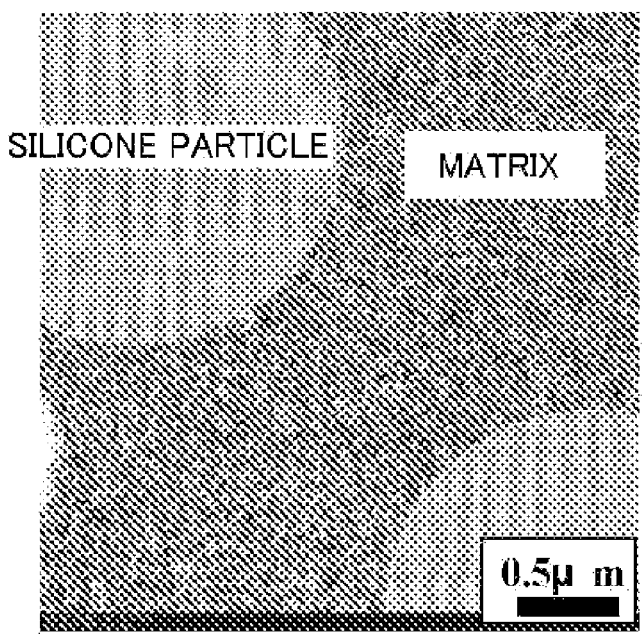
FIG. 10 is transmission photomicrographs in which the presence or absence of a concentration adjusted area is confirmed regarding a light diffusing element of Comparative Example 1.
Figure 10:
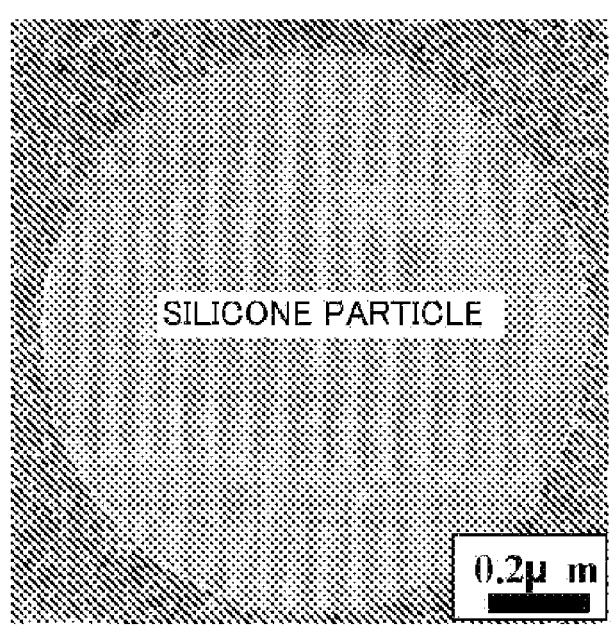

Four parts of silicone resin fine particles ("Tospearl 120" (trade name), average particle diameter: 2.0 μm, refractive index: 1.43, manufactured by Momentive Performance Materials Inc.) were added to a solution in which 20 parts of an acrylonitrile-styrene copolymer (AS) resin ("Stylac AS" (trade name), refractive index: 1.57, manufactured by Asahi Kasei Chemicals Corporation) were dissolved in 100 parts of cyclopentanone (CPN) to prepare an application liquid. The solid content of the application liquid was 19.4%. The application liquid was applied onto a TAC film ("Fujitac" (trade name), manufactured by Fuji Photo Film Co., Ltd.) with an applicator immediately after the application liquid was prepared and dried at 150° C. for one minute to obtain a light diffusing element with a thickness of 50 μm. The obtained light diffusing element was evaluated for the above-mentioned items (1) to (6). Table 1 shows the results. Further, FIG. 10 shows TEM photographs in each of which the presence or absence of a concentration adjusted area was confirmed. The concentration adjusted area was observed at a position where r2/r1 was 50.0%.

Comparative Example 2

A light diffusing element with a thickness of 10 μm was obtained in the same way as in Comparative Example 1, except for changing the coating thickness of the application liquid. The obtained light diffusing element was evaluated for the above-mentioned items (1) to (6). Table 1 shows the results.

Comparative Example 3

A light diffusing element having a construction not containing an ultrafine particle component was manufactured by the following procedure.

To 25 parts of a 50% methyl ethyl ketone (MEK) solution of fluorene-based acrylate ("Ogsol EA-0200" (trade name), refractive index: 1.62, manufactured by Osaka Gas Chemicals Co., Ltd.), 0.068 part of a photopolymerization initiator ("Irgacure 907" (trade name), manufactured by Ciba Specialty Chemicals), 0.625 part of a leveling agent ("GRANDIC PC 4100" (trade name), manufactured by DIC Corporation), and 2.5 parts of PMMA fine particles ("Art Pearl J-4P" (trade name), average particle diameter: 2.1 μm, manufactured by Negami Chemical Industrial Co., Ltd.) were added. The mixture was subjected to ultrasonic treatment for 5 minutes to prepare an application liquid in which the above-mentioned respective components were dispersed uniformly. The solid content of the application liquid was 54.5%. The application liquid was applied onto a TAC film ("Fujitac" (trade name), manufactured by Fuji Photo Film. Co., Ltd.) with a bar coater immediately after the application liquid was prepared, dried at 100° C. for one minute, and irradiated with UV light with an integrated light quantity of 300 mJ to obtain a light diffusing element with a thickness of 20 μm. The obtained light diffusing element was evaluated for the above-mentioned items (1) to (6). Table 1 shows the results.

Comparative Example 4

A light diffusing element was obtained in the same way as in Example 8, except for changing the light diffusing fine particles to silicone fine particles ("Tospearl 120" (trade name), average particle diameter: 2.0 μm, refractive index: 1.43, manufactured by Momentive Performance Materials Inc.) and changing the thickness to 13 μm. The obtained light diffusing element was evaluated for the above-mentioned items (1) to (6). Table 1 shows the results.

Example 16

Production of Liquid Crystal Display Apparatus

A liquid crystal cell was removed from a commercially available liquid crystal TV ("KDL20J3000" (trade name), BRAVIA (20-inch), manufactured by Sony Corporation) having a liquid crystal cell of a multi-domain type VA mode. Commercially available polarizing plates ("NPF-SEG1423DU" (trade name), manufactured by Nitto Denko Corporation) were attached to both sides of the liquid crystal cell so that absorption axes of the respective polarizers were perpendicular to each other. More specifically, the polarizing plates were attached to the liquid crystal cell so that the absorption axis direction of the polarizer of the backlight side polarizing plate became a vertical direction (90° with respect to the longitudinal direction of the liquid crystal panel) and the absorption axis direction of the polarizer of the viewer side polarizing plate became a horizontal direction (0° with respect to the longitudinal direction of the liquid crystal panel). Further, the light diffusing element of Example 1 was transferred from the base material to be attached to the outer side of the viewer side polarizing plate to produce a liquid crystal panel.

Meanwhile, a pattern of a lenticular lens was transferred to one surface of a PMMA sheet by melt thermal transfer, using a transfer roll. Aluminum was pattern deposited to a surface (smooth surface) on a side opposite to the surface on which the lens pattern was formed so that light passed through only a focal point of the lens, and thus, a reflective layer having an area ratio of an opening of 7% (area ratio of a reflection portion of 93%) was formed. Thus, a light collecting element was produced. As a light source of a backlight, a cold cathode fluorescent lamp (CCFL of BRAVIA20J, manufactured by Sony Corporation) was used, and the light collecting element was attached to the light source to produce a collimated light source device (backlight unit) emitting collimated light.

Figure 11:
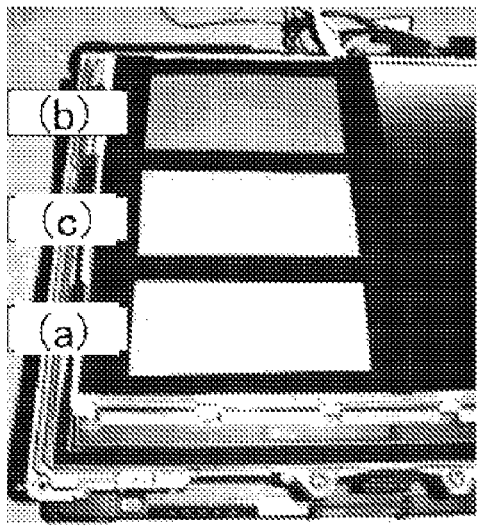
FIG. 11 is photographs showing display states in the case where the light diffusing elements of Example 1 and Comparative Examples 2 and 3 are incorporated in liquid crystal display apparatuses for comparison.
Figure 11:
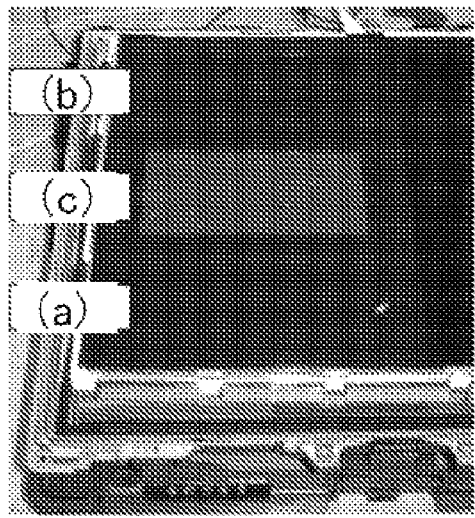

The backlight unit was incorporated into the liquid crystal panel to produce a liquid crystal display apparatus of a collimated backlight front diffusing system. A white display and a black display were performed in a dark place in the obtained liquid crystal display apparatus, and the display states were visually observed. FIG. 11 shows photographs of the display states in the case where the white display in a dark place and the black display in a light place are seen in an oblique direction. The photographs are provided with the example No. (Example 1) of the light diffusing element.

Comparative Example 5

A liquid crystal display apparatus was produced in the same way as in Example 16, except for using the light diffusing element of Comparative Example 2. A white display and a black display were performed in a dark place in the obtained liquid crystal display apparatus, and the display states were visually observed. FIG. 11 shows photographs of the display states in the case where the white display in a dark place and the black display in a light place are seen in an oblique direction. The photographs are provided with the comparative example No. (Comparative Example 2) of the light diffusing element.

Comparative Example 6

A liquid crystal display apparatus was produced in the same way as in Example 16, except for using the light diffusing element of Comparative Example 3. A white display and a black display were performed in a dark place in the obtained liquid crystal display apparatus, and the display states were visually observed. FIG. 11 shows photographs of the display states in the case where the white display in a dark place and the black display in a light place are seen in an oblique direction. The photographs are provided with the comparative example No. (Comparative Example 3) of the light diffusing element.

Example 17

Production of Liquid Crystal Display Apparatus

A liquid crystal cell was removed from a commercially available liquid crystal TV ("KDL20J3000" (trade name), BRAVIA (20-inch), manufactured by Sony Corporation) having a liquid crystal cell of a multi-domain type VA mode. Commercially available polarizing plates ("NPF-SEG1423DU" (trade name), manufactured by Nitto Denko Corporation) were attached to both sides of the liquid crystal cell so that absorption axes of the respective polarizers were perpendicular to each other. More specifically, the polarizing plates were attached to the liquid crystal cell so that the absorption axis direction of the polarizer of the backlight side polarizing plate became a vertical direction (90° with respect to the longitudinal direction of the liquid crystal panel) and the absorption axis direction of the polarizer of the viewer side polarizing plate became a horizontal direction (0° with respect to the longitudinal direction of the liquid crystal panel). Further, the light diffusing element of Example 8 was transferred from the base material to be attached to the outer side of the viewer side polarizing plate to produce a liquid crystal panel.

Meanwhile, a pattern of a lenticular lens was transferred to one surface of a PMMA sheet by melt thermal transfer, using a transfer roll. Aluminum was pattern deposited to a surface (smooth surface) on aside opposite to the surface on which the lens pattern was formed so that light passed through only a focal point of the lens, and thus, a reflective layer having an area ratio of an opening of 7% (area ratio of a reflection portion of 93%) was formed. Thus, a light collecting element was produced. As a light source of a backlight, a cold cathode fluorescent lamp (CCFL of BRAVIA20J, manufactured by Sony Corporation) was used, and the light collecting element was attached to the light source to produce collimated light source device (backlight unit) emitting collimated light.

The backlight unit was incorporated into the liquid crystal panel to produce a liquid crystal display apparatus of a collimated backlight front diffusing system. A white display and a black display were performed in a dark place in the obtained liquid crystal display apparatus, and the display states were visually observed. As a result, in the case where the display states were seen in an oblique direction, satisfactory display properties were obtained in which the black display was black in a light place and the brightness of the white display in a dark place was high.

Comparative Example 7

A liquid crystal display apparatus was produced in the same way as in Example 17, except for using the light diffusing element of Comparative Example 4. A white display and a black display were performed in a dark place in the obtained liquid crystal display apparatus, and the display states were visually observed. Asa result, in the case where the display states were seen in an oblique direction, although the brightness of the white display in a dark place was high, the black display in a bright place looked whitish.

<Evaluation>

As is apparent from Table 1, the light diffusing element of each of the examples of the present invention has a high haze value in spite of its very small thickness and has a small backscattering ratio. On the other hand, in the comparative examples, when an attempt is made so as to realize a high haze value while suppressing backscattering, the thickness should be set to be very large (Comparative Example 1), and when an attempt is made so as to realize a high haze value with a rather small thickness, backscattering becomes very large (Comparative Example 3). Further, as is apparent from FIG. 10, the liquid crystal display apparatus on which the light diffusing element of Example 1 is mounted, when seen in an oblique direction, satisfactory display properties are exhibited in which a black display is performed as black in a light place, and the brightness of a white display in a dark place is high. On the other hand, in the liquid crystal display apparatus on which the light diffusing element of Comparative Example 2 is mounted, although a black display in a light place is performed as black, the brightness of a white display in a dark place is insufficient and dark. In the liquid crystal display apparatus on which the light diffusing element of Comparative Example 3 is mounted, although the brightness of a white display in a dark place is high, white blurring is serious in a black display in a light place.

Further, as is apparent from the comparison between Example 1, and Examples 8, 9 and 12 to 14, by forming the second concentration adjusted area, even when the thickness of a light diffusing element is set to be remarkably small, a light diffusing element having a very high haze value and very small backscattering can be obtained, compared with the case where the second concentration adjusted area is not formed. Further, it is understood from the results of Examples 9 to 13 that a light diffusing element having higher diffusibility is obtained as a still standing time is larger within the maximum swelling time, and the diffusibility of a light diffusing element to be obtained is almost constant even if the still standing time becomes longer after exceeding the maximum swelling time. Further, it is understood that, by forming the second concentration adjusted area while keeping a predetermined still standing time, a light diffusing element having a high haze value is obtained even when dried at low temperature (drying at low temperature is preferred because production cost and stability are excellent).

As described above, according to the present invention, alight diffusing element having a high haze value in spite of its very small thickness and having a small backscattering ratio was obtained. A liquid crystal display apparatus of a collimated backlight front diffusing system in which such light diffusing element was incorporated exhibited satisfactory display properties in which a black display was performed as black in a light place and the brightness of a white display was high in a dark place.

INDUSTRIAL APPLICABILITY

The light diffusing element and the polarizing plate with a light diffusing element of the present invention can each be used suitably in a viewer side member of a liquid crystal display apparatus, a member for a backlight of a liquid crystal display apparatus, and a diffusing member for illumination equipment (for example, an organic EL, LED), particularly suitably as a front diffusing element of a liquid crystal display apparatus of a collimated backlight front diffusing system.

| Reference Signs List | |
|---|---|
| 10 | matrix |
| 11 | resin component |
| 12 | ultrafine particle component |
| 20 | light diffusing fine particle |
| 31 | concentration adjusted area (first concentration adjusted area) |
| 32 | second concentration adjusted area |
| 100 | light diffusing element |
| 110 | polarizer |
| 120 | protective layer |
| 130 | protective layer |
| 200 | polarizing plate with light diffusing element |
| 500 | liquid crystal display apparatus |

The invention claimed is:
1. A light diffusing element, comprising: a matrix containing a resin component and an ultrafine particle component; and light diffusing fine particles dispersed in the matrix, wherein:

refractive indices of the resin component, the ultrafine particle component, and the light diffusing fine particles satisfy the below-indicated expression (1); and the light diffusing element comprises a concentration adjusted area, which is formed in an outer portion of a vicinity of a surface of each of the light diffusing fine particles, and in which a weight concentration of the resin component decreases and a weight concentration of the ultrafine particle component increases with increasing distance from the light diffusing fine particles:

$$|n_P - n_A| < |n_P - n_B| \qquad (1)$$

where $n_A$ represents the refractive index of the resin component of the matrix, $n_B$ represents the refractive index of the ultrafine particle component of the matrix, and $n_P$ represents the refractive index of the light diffusing fine particles.

2. A light diffusing element according to claim 1, wherein the light diffusing element further comprises a second concentration adjusted area formed by permeation of the resin component to an inner portion of the vicinity of the surface of each of the light diffusing fine particles.

3. A light diffusing element according to claim 1, wherein the light diffusing element has a haze of 90% to 99%.

4. A light diffusing element according to claim 1, wherein the refractive indices of the resin component, the ultrafine particle component, and the light diffusing fine particles satisfy $0.01 \leq |n_P - n_A| \leq 0.10$ and $0.10 \leq |n_P - n_B| \leq 1.50$.

5. A light diffusing element according to claim 1, wherein the resin component and the light diffusing fine particles are formed of materials of the same type, and the ultrafine particle component is formed of a material of a different type from those of the resin component and the light diffusing fine particles.

6. A light diffusing element according to claim 5, wherein the resin component and the light diffusing fine particles are each formed of an organic compound, and the ultrafine particle component is formed of an inorganic compound.

7. A light diffusing element according to claim 1, wherein the light diffusing fine particles have an average particle diameter of 1 μm to 5 μm.

8. A light diffusing element according to claim 1, wherein the ultrafine particle component has an average particle diameter of 1 nm to 100 nm.

9. A light diffusing element according to claim 1, wherein the light diffusing element has a light diffusion half-value angle of 10° to 150°.

10. A polarizing plate with a light diffusing element, comprising: the light diffusing element according to claim 1; and a polarizer.

11. A liquid crystal display apparatus, comprising:
a liquid crystal cell;
a collimated light source device, which emits collimated light to the liquid crystal cell; and
the light diffusing element according to claim 1, which transmits and diffuses the collimated light passing through the liquid crystal cell.

12. A manufacturing method for the light diffusing element according to claim 1, comprising the steps of:
coating an application liquid, in which a resin component of a matrix or a precursor thereof, an ultrafine particle component, and light diffusing fine particles are dissolved or dispersed in a volatile solvent, onto a base material; and
drying the application liquid coated onto the base material.

13. A manufacturing method for the light diffusing element according to claim 12, further comprising the steps of: bringing the precursor of the resin component into contact with the light diffusing fine particles in the application liquid; and allowing at least a part of the precursor to permeate an inner portion of the light diffusing fine particles.

14. A manufacturing method for the light diffusing element according to claim 13, wherein the bringing the precursor of the resin component into contact with the light diffusing fine particles in the application liquid is carried out for a period of time longer than that required for a particle diameter of each of the light diffusing fine particles to become substantially maximum.

15. A manufacturing method for the light diffusing element according to claim 13, wherein the permeation step comprises allowing the precursor to permeate in a range of 10% or more and 95% or less of an average particle diameter of the light diffusing fine particles from the surface of each of the light diffusing fine particles.

16. A manufacturing method for the light diffusing element according to claim 12, further comprising the step of polymerizing the precursor after the coating step.

17. A manufacturing method for the light diffusing element according to claim 16, wherein the polymerization step comprises polymerizing the precursor that permeates the inner portion of the light diffusing fine particles and the precursor that does not permeate the light diffusing fine particles simultaneously, thereby forming the second concentration adjusted area in the inner portion of the vicinity of the surface of each of the light diffusing fine particles and simultaneously forming the matrix and the first concentration adjusted area.

18. A manufacturing method for the light diffusing element according to claim 16, wherein the resin component comprises an ionizing radiation-curable resin, and the precursor of the resin component is polymerized by irradiating the precursor with ionizing radiation.

* * * * *